(12) United States Patent
Jiang et al.

(10) Patent No.: US 12,447,905 B2
(45) Date of Patent: Oct. 21, 2025

(54) VEHICLE TERMINAL CONTROL METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Shouxin Jiang, Shenzhen (CN); Can Hu, Shenzhen (CN); Hongbo Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 140 days.

(21) Appl. No.: 18/455,583

(22) Filed: Aug. 24, 2023

(65) Prior Publication Data

US 2023/0406227 A1 Dec. 21, 2023

Related U.S. Application Data

(63) Continuation of application No. PCT/CN2022/131057, filed on Nov. 10, 2022.

(30) Foreign Application Priority Data

Jan. 21, 2022 (CN) .......................... 202210070015.X

(51) Int. Cl.
*G06F 3/0481* (2022.01)
*B60R 11/02* (2006.01)
(Continued)

(52) U.S. Cl.
CPC ........ *B60R 11/0264* (2013.01); *B60R 16/023* (2013.01); *G06F 3/0362* (2013.01);
(Continued)

(58) Field of Classification Search
CPC .......... G06F 3/00; G06F 13/00; G06F 3/0481; G06F 9/451; G06F 3/048; G06F 3/0482;
(Continued)

(56) References Cited

U.S. PATENT DOCUMENTS 6,650,345 B1 * 11/2003 Saito ...................... G01C 21/36
715/764
11,837,231 B2 * 12/2023 Penilla ................ B60R 16/0373
(Continued)

FOREIGN PATENT DOCUMENTS

CN 105446172 A 3/2016
CN 108958569 A 12/2018
(Continued)

OTHER PUBLICATIONS

The World Intellectual Property Organization (WIPO) International Search Report for PCT/CN2022/131057 Jan. 16, 2023 12 Pages (including translation).

(Continued)

*Primary Examiner* — Rayeez R Chowdhury
(74) *Attorney, Agent, or Firm* — Anova Law Group, PLLC

(57) ABSTRACT

A control method is performed by a vehicle terminal, the vehicle terminal being provided with a touch screen and a hardware peripheral, and a mini program relying on a mini program engine running in the vehicle terminal. The control method includes displaying a mini program interface of the mini program, the mini program interface comprising at least two components; controlling a first component of the at least two components in the mini program interface to perform a first event in response to a physical control operation on the hardware peripheral; and controlling a second component of the at least two components in the mini program interface to (Continued)

program interface to perform the first event in response to a touch operation on the touch screen.

19 Claims, 13 Drawing Sheets

(51) Int. Cl.
  *B60R 16/023* (2006.01)
  *G06F 3/0362* (2013.01)
  *G06F 3/0485* (2022.01)
  *G06F 3/04886* (2022.01)
  *B60R 11/00* (2006.01)

(52) U.S. Cl.
  CPC .......... *G06F 3/0481* (2013.01); *G06F 3/0485* (2013.01); *G06F 3/04886* (2013.01); *B60R 2011/0007* (2013.01)

(58) Field of Classification Search
  CPC ...... G06F 9/44; G06F 3/0362; G06F 3/04842; G06F 3/0485; G06F 3/04886; G06F 8/71; G06F 9/445
  See application file for complete search history.

(56) References Cited

U.S. PATENT DOCUMENTS

| | | | | |
|---|---|---|---|---|
| 2008/0148187 A1* | 6/2008 | Miyata | ................ | G06F 3/03548 715/840 |
| 2013/0321633 A1* | 12/2013 | Peterson | ............... | G06F 3/0443 348/148 |
| 2018/0004473 A1* | 1/2018 | Amaru | ................... | B60K 35/00 |
| 2018/0088731 A1* | 3/2018 | Wang | .................... | G06F 3/0488 |
| 2018/0337870 A1* | 11/2018 | Schubert | ................ | H04L 51/02 |
| 2020/0152197 A1* | 5/2020 | Penilla | .................. | H04L 67/125 |
| 2023/0401025 A1* | 12/2023 | Liu | ........................ | B60K 35/81 |

FOREIGN PATENT DOCUMENTS

| | | |
|---|---|---|
| CN | 109828807 A | 5/2019 |
| CN | 111625169 A | 9/2020 |
| CN | 111724785 A | 9/2020 |
| CN | 112394869 A | 2/2021 |
| CN | 114407796 A | 4/2022 |

OTHER PUBLICATIONS

China National Intellectual Property Administration (CNIPA) Office Action 1 for 202210070015.X Sep. 4, 2024 10 Pages (including translation).

* cited by examiner

VEHICLE TERMINAL CONTROL METHOD, COMPUTER DEVICE, AND STORAGE MEDIUM

CROSS-REFERENCES TO RELATED APPLICATIONS

This application is a continuation application of PCT Patent Application No. PCT/CN2022/131057, filed on Nov. 10, 2022, which claims priority to Chinese Patent Application No. 202210070015.X, filed on Jan. 21, 2022, all of which is incorporated by reference in their entirety.

FIELD OF THE TECHNOLOGY

The present disclosure relates to the field of vehicle central control and, in particular, to a vehicle terminal control method and apparatus, a device, and a storage medium.

BACKGROUND OF THE DISCLOSURE

With the development of intelligent driving and 5G network, functions of vehicle terminals are more and more diversified and intelligent, and mini programs may be run on the vehicle terminals.

The mini programs are programs that run relying on a mini program engine. As the vehicle terminal supports the mini program engine, the mini program engine may support one or more mini programs to run. The mini programs are originally designed for touch screen applications of a smart phone, so that the mini programs on the vehicle terminal also adopt a human-computer interaction mode based on the touch screen.

However, in response to that a driver uses the touch screen to control the vehicle terminal while driving, the driver's sight may have to focus on the touch screen of the vehicle terminal, causing unsafe driving. Therefore, it is urgent to provide a mini program control method with improved driving safety.

SUMMARY

One aspect of the present disclosure provides a control method, performed by a vehicle terminal, the vehicle terminal being provided with a touch screen and a hardware peripheral, and a mini program relying on a mini program engine running in the vehicle terminal. The method includes displaying a mini program interface of the mini program, the mini program interface comprising at least two components; controlling a first component of the at least two components in the mini program interface to perform a first event in response to a physical control operation on the hardware peripheral; and controlling a second component of the at least two components in the mini program interface to perform the first event in response to a touch operation on the touch screen.

Another aspect of the present disclosure provides a computer device. The computer device includes a processor and a memory, the memory storing at least one program that, when being executed, causes the processor to implement a control method, performed by a vehicle terminal, the vehicle terminal being provided with a touch screen and a hardware peripheral, and a mini program relying on a mini program engine running in the vehicle terminal. The method includes displaying a mini program interface of the mini program, the mini program interface comprising at least two components; controlling a first component of the at least two components in the mini program interface to perform a first event in response to a physical control operation on the hardware peripheral; and controlling a second component of the at least two components in the mini program interface to perform the first event in response to a touch operation on the touch screen.

Another aspect of the present disclosure provides a non-transitory computer-readable storage medium, storing an executable instruction that, when being executed, causes the processor to implement a control method, performed by a vehicle terminal, the vehicle terminal being provided with a touch screen and a hardware peripheral, and a mini program relying on a mini program engine running in the vehicle terminal. The method includes displaying a mini program interface of the mini program, the mini program interface comprising at least two components; controlling a first component of the at least two components in the mini program interface to perform a first event in response to a physical control operation on the hardware peripheral; and controlling a second component of the at least two components in the mini program interface to perform the first event in response to a touch operation on the touch screen.

As disclosed, by using the hardware peripherals such as a physical knob, a physical toggle button, a hardware button, and the like to control the mini program, the mini program is controlled by the hardware peripheral and the touch screen at the same time, which provides a safe control method for the vehicle terminal; and moreover, this function may be used for all mini programs without further modification or development of the mini programs for any specific specification, providing a suitable solution for applying the mini program to the vehicle terminal at low cost.

DESCRIPTION OF EMBODIMENTS

Figure 1:
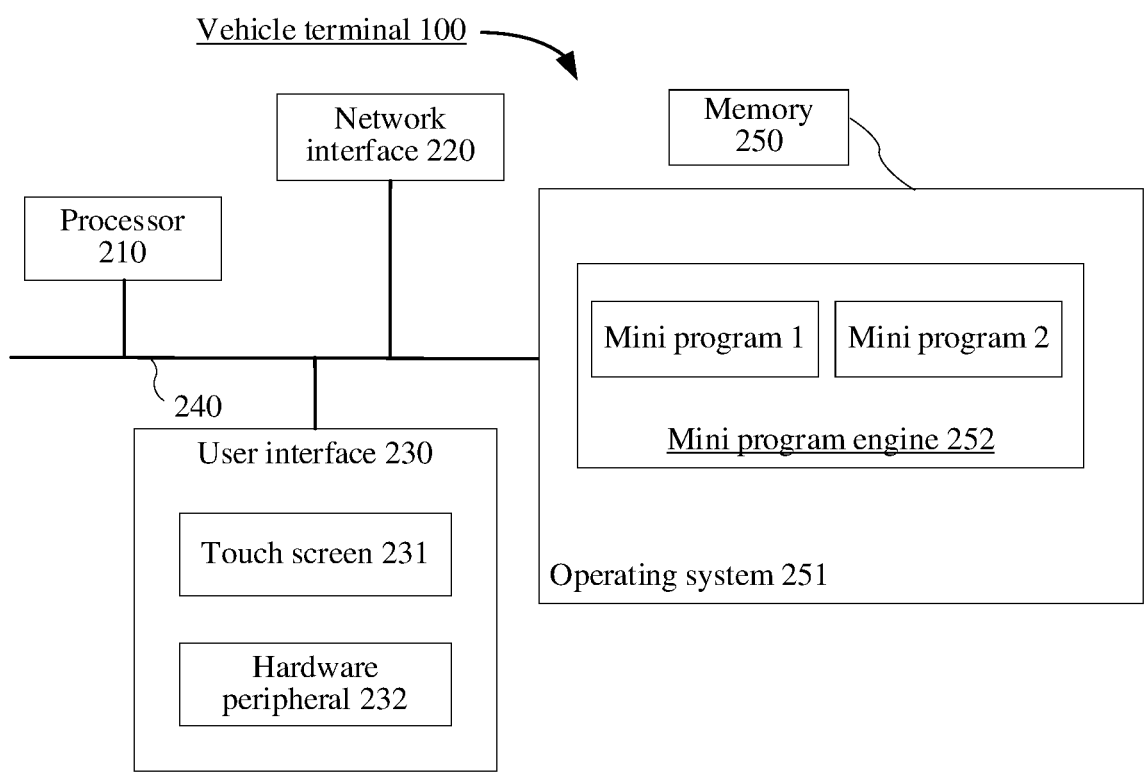
FIG. 1 is a structural block diagram of a vehicle terminal according to an embodiment of the present disclosure.

FIG. 1 shows a structural block diagram of a vehicle terminal 100 according to an exemplary embodiment of the present disclosure. The vehicle terminal 100 includes: at least one processor 210, a memory 250, at least one network interface 220, and a user interface 230. Components in the server 200 are coupled together by using a bus system 240. It is to be understood that the bus system 240 is configured to implement connection and communication between the components. In addition to a data bus, the bus system 240 further includes a power bus, a control bus, and a state signal bus. However, for ease of clear description, all types of buses in FIG. 1 are marked as the bus system 240.

The processor 210 may be an integrated circuit chip with signal processing capacity, such as a general processor, a digital signal processor (DSP), another programmable logic device, a discrete gate or transistor logic device, or a discrete hardware assembly, or the like. The general processor may be a microprocessor or any conventional processor, or the like.

The user interface 230 includes one or more output devices that can show medium content. Typically, the output device includes: a touch screen 231 and a hardware peripheral 232. The hardware peripheral 232 includes: at least one of a hardware knob, a hardware toggle button, a hardware touch pad, and a hardware button. In an example, the hardware peripheral 232 includes: the hardware knob for triggering a selection operation, a confirm button for triggering a confirmation operation, and a back button for triggering a back operation. The hardware knob for triggering the selection operation may also be implemented alternatively as a hardware toggle button or a hardware touch pad. In some examples, there is a center console button supporting multiple control functions, and the center console button also supports at least one of rotation control, toggle button control, touch pad control, and button control. In one embodiment, the hardware peripheral 232 refers to an input peripheral of a non-touch screen, or an input peripheral in a physical input form, or an input peripheral adopting mechanical input or electromechanical input. The electromechanical input refers to a form combining the mechanical input and the electric input, and is also referred to as a semi-mechanical form; and the hardware peripheral 232 is also referred to as a physical control device.

The memory 250 may be removable, irremovable or a combination thereof. The exemplary hardware device includes a solid memory, a hard disk drive, an optical disk drive, and the like. The memory 250 in one embodiment includes one or more storage devices that are physically away from the processor 210.

The memory 250 includes a volatile memory or a non-volatile memory, or may include both the volatile memory and the non-volatile memory. The non-volatile memory may be a read-only memory (ROM), and the volatile memory may be a random access memory (RAM). The memory 250 described in the embodiment of the present disclosure aims at including any other suitable type of memories.

In some embodiments, the memory 250 can store data to support various operations. An example of these data includes a program, a module, and a data structure or a subset or a superset thereof, which may be exemplarily described below.

An operating system 251 includes system programs for processing various basic system services and executing hardware-related tasks, such as a frame layer, a core library layer, a drive layer, and the like, which is configured to implement various basic services and process hardware-based tasks. The operating system 251 may be various vehicle engine operating systems, and a specific type of the vehicle engine operating system is not limited.

A mini program engine 252 is run in the operating system 251. The mini program engine 252 is configured to provide a running environment for the mini program, one or more mini programs, such as a mini program 1 and a mini program 2 are run in the mini program engine 252. No matter what kind of vehicle engine operating system, as long as there is the mini program engine 252 running in the vehicle engine operating system, the mini program may rely on the mini program engine 252 for operation.

Figure 2:
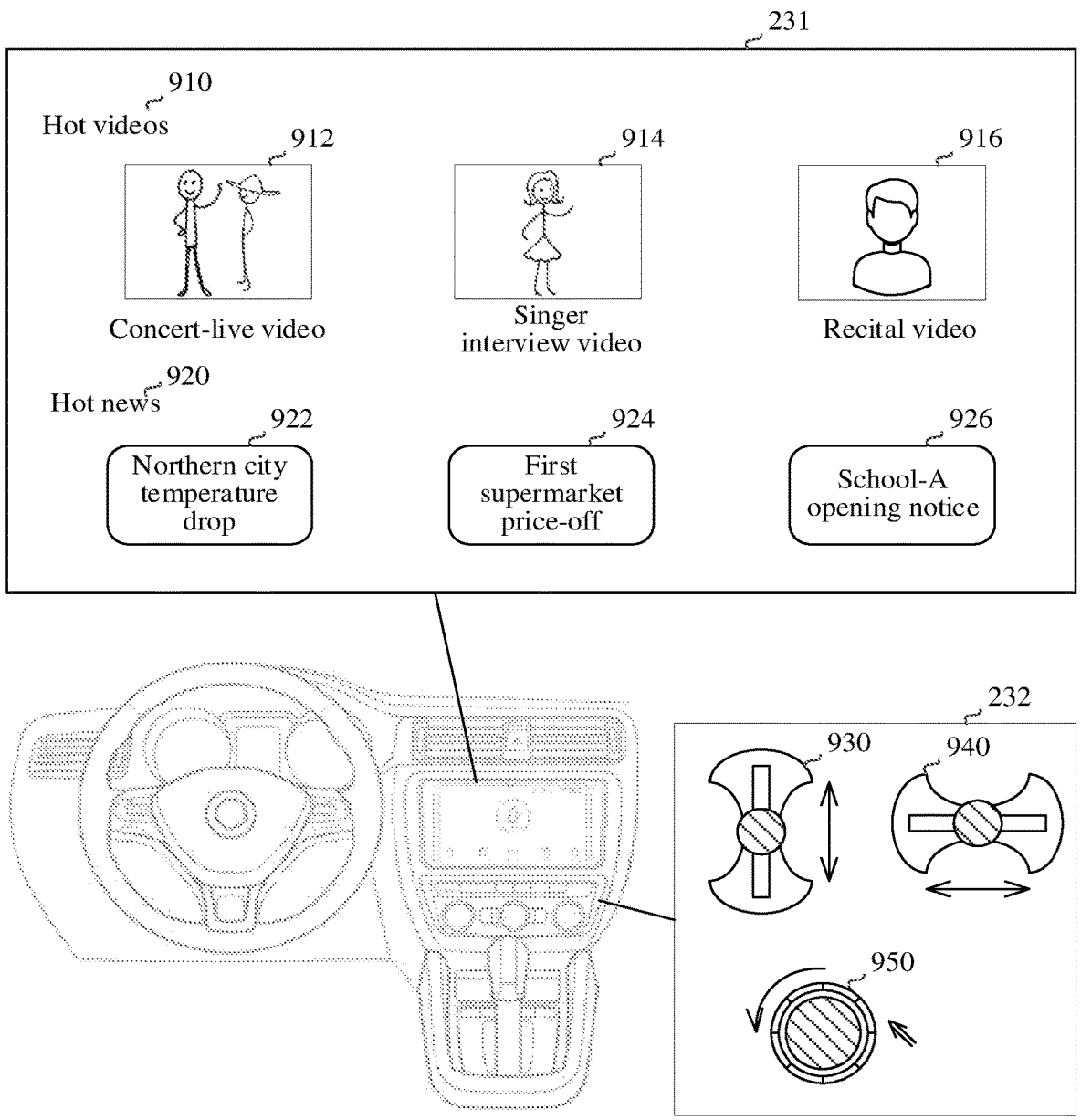
FIG. 2 is a schematic scene diagram of a mini program control method based on a vehicle terminal according to an exemplary embodiment of the present disclosure.

FIG. 2 is a schematic scene diagram of a mini program control method based on a vehicle terminal according to an embodiment of the present disclosure. The process of controlling a mini program by using a hardware peripheral in the vehicle terminal is exemplarily introduced in this section.

The vehicle terminal is provided with a touch screen 231 and a hardware peripheral 232; in this embodiment, the touch screen 231 displays a mini program interface, and the mini program interface includes a hot video display area 910 and a hot new display area 920; the hot video display area 910 includes the following components: a concert-live video component 912, a singer interview video component 914, and a recital video component 916; and the hot new display area 920 includes the following components: a northern city temperature-drop news component 922, a first supermarket price-off news component 924, and a school-A opening notice component 926.

The hardware peripheral 232 includes: a longitudinal toggle button 930, a lateral toggle button 940, and a rotation tap button 950.

In the present disclosure, in response to a physical control operation on the hardware peripheral, a first component in the mini program interface is controlled to perform a first event.

The control process of the vehicle terminal at least includes the following four human-computer interaction modes based on the hardware peripheral.

Human-computer interaction mode I based on the hardware peripheral: in response to a confirmation operation for the hardware peripheral, the first component is controlled to perform a response event. The confirmation operation may be an operation of tapping the rotation tap button 950.

Human-computer interaction mode II based on the hardware peripheral: in response to a first type of control operation for the hardware peripheral, a focus component in a focus state is switched, and a previous or next component (a first component) is controlled to be in the focus state. The first type of control operation may be an operation of toggling the lateral toggle button 940.

Human-computer interaction mode III based on the hardware peripheral: in response to a second type of control operation for the hardware peripheral, a hierarchy of the focus component in the focus state is switched, and a component (the first component) at a previous hierarchy or a next hierarchy is controlled to be in the focus state. The second type of control operation may be an operation of toggling the longitudinal toggle button 930.

Human-computer interaction mode IV based on the hardware peripheral: in response to a third type of operation for the hardware peripheral, it is controlled to return to an upper interface of the mini program interface, or to close the mini program interface, or to close a pop-up window on the mini program interface. The third type of control operation may be an operation of counterclockwise rotating the rotation tap button 950.

The control of the vehicle terminal that is implemented in the four human-computer interaction modes based on the hardware peripheral is introduced below in combination with the touch screen 231 and the hardware peripheral 232 in FIG. 2: the touch screen 231 may display a mini program interface different from that shown in FIG. 2, and the hardware peripheral 232 may include more or less hardware such as buttons.

Human-computer interaction mode I based on the hardware peripheral: in response to the confirmation operation for the hardware peripheral, the first component is controlled to perform a response event.

Exemplarily, the confirmation operation for the hardware peripheral is to tap the rotation tap button 950; in response to the confirmation operation for the hardware peripheral, the first component is controlled to perform the response event; and in response to that a first component is the recital video component 916, the response event of playing back a recital video is performed.

Human-computer interaction mode II based on the hardware peripheral: in response to the first type of control operation for the hardware peripheral, a focus component in a focus state is switched, and a previous or next component (the first component) is controlled to be in the focus state.

Exemplarily, the first type of control operation for the hardware peripheral is to toggle the lateral toggle button 940.

in response to that the singer interview video component 914 is in the focus state, in response to toggling the horizontal toggle button 940 to right, the singer interview video component 914 loses the focus state, and the next component of the singer interview video component 914, i.e., the recital video component 916 is in the focus state; and the switching for the component is implemented.

Human-computer interaction mode III based on the hardware peripheral: in response to the second type of control operation for the hardware peripheral, the hierarchy of the focus component in the focus state is switched, and a component (the first component) at a previous hierarchy or a next hierarchy is controlled to be in the focus state.

Exemplarily, the second type of control operation for the hardware peripheral is to toggle the longitudinal toggle button 930.

The hierarchy of the component included in the hot video display area 910 is a primary hierarchy, and the hierarchy of the component included in the hot new display area 920 is a secondary hierarchy.

in response to that the recital video component 916 is in the focus state, in response to downward toggling the longitudinal toggle button 930, the recital video component 916 loses the focus state, the component is switched from the primary hierarchy to the secondary hierarchy, and the first component, i.e., the northern city temperature-drop news component 922 in the three components with the component hierarchy being the secondary hierarchy is in the focus state; and the switching for the hierarchy of the component is implemented.

Human-computer interaction mode IV based on the hardware peripheral: in response to a third type of control operation for the hardware peripheral, it is controlled to return to an upper interface of the mini program interface, or to close the mini program interface, or to close a pop-up window on the mini program interface.

Exemplarily, the third type of control operation of the hardware peripheral is to counterclockwise rotate the rotation tap button 950.

The rotation tap button 950 is rotated counterclockwise at the mini program interface, and it is controlled to return to the upper interface of the mini program interface.

As such, the method provided in this embodiment controls the mini program by using the hardware peripherals such as the physical knob, the physical toggle button, the hardware button, and the like; the mini program can be controlled by the hardware peripheral and the touch screen at the same time, and a safe control method is provided on the vehicle terminal; and a corresponding vehicle terminal control method on the hardware peripherals is provided for a touch confirm event, a touch switching event, the touch hierarchy switching event, and a touch closing event, and the touch operation is connected with the physical control operation on the hardware peripheral.

The implementation of the vehicle terminal control process is introduced by using the following two schematic diagrams.

Figure 3:
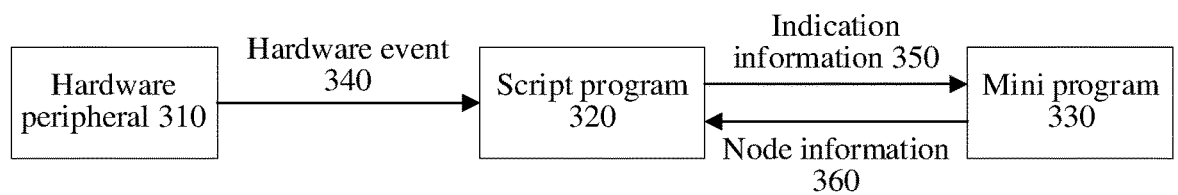
FIG. 3 is a schematic diagram of vehicle terminal control according to an exemplary embodiment of the present disclosure.

FIG. 3 is a schematic diagram of vehicle terminal control according to an exemplary embodiment of the present disclosure.

A hardware peripheral 310 of a vehicle terminal transmits a hardware event 340 to a script program 320; exemplarily, the hardware event 340 is transmitted based on a static library (Protobuf) protocol, and the script program 320 is used for implementing communication with a mini program 330 so as to respond to the hardware event 340 triggered on the hardware peripheral 310; and the hardware peripheral 310 is a zentrales bedienelement iDrive controller (ZBE). The hardware event 340 may, but is not limited to, respond to at least one of tap, movement, and selection.

The script program 320 transmits indication information 350 to the mini program 330 according to the hardware event 340; the indication information 350 is used for controlling a target component of a mini program interface to perform a first event; and the component in the mini program interface corresponds to a node of the mini program 330.

In one embodiment, the mini program 330 transmits node information 360 to the script program 320, that is, the script program 320 transmits the indication information 350 to the mini program 330 according to the hardware event 340 and the node information 360.

Figure 4:
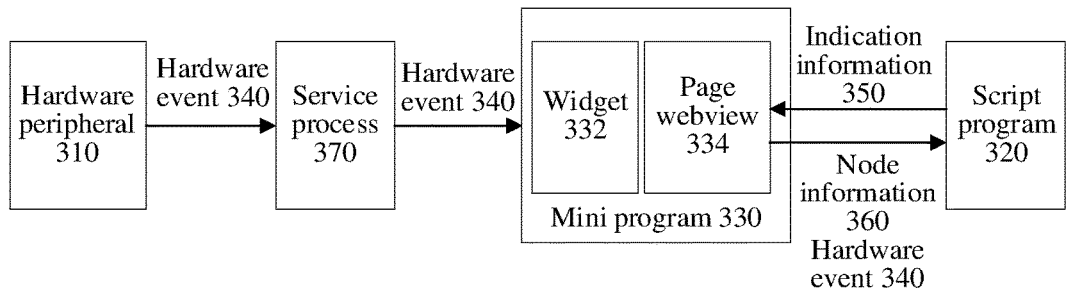
FIG. 4 is a schematic diagram of vehicle terminal control according to an exemplary embodiment of the present disclosure.

In one embodiment, as shown in FIG. 4, in an optional design, the hardware peripheral 310 transmits the hardware event 340 to a service process 370, the service process 370 distributes the hardware event 340 to the mini program 330, and the hardware event 340 is transmitted by the mini program 330 to the script program 320.

The service process 370 is a moss service process provided by a vehicle operating system and used for distributing the hardware event 340 of the hardware peripheral 310; and the mini program 330 includes a widget 332 and a page web-view 334. The widget 332 is configured to implement page display of the mini program 330; the page web-view 334 is configured to implement information communication with the script program 320, and exemplarily, the page web-view 334 transmits the node information 360 and the hardware event 340 to the script program 320, which is implemented by evaluate JavaScript established on a mini program engine; and the script program 320 transmits the indication information 350 to the page web-view 334, which is implemented by a JavaScript bridge established on the mini program engine.

Figure 5:
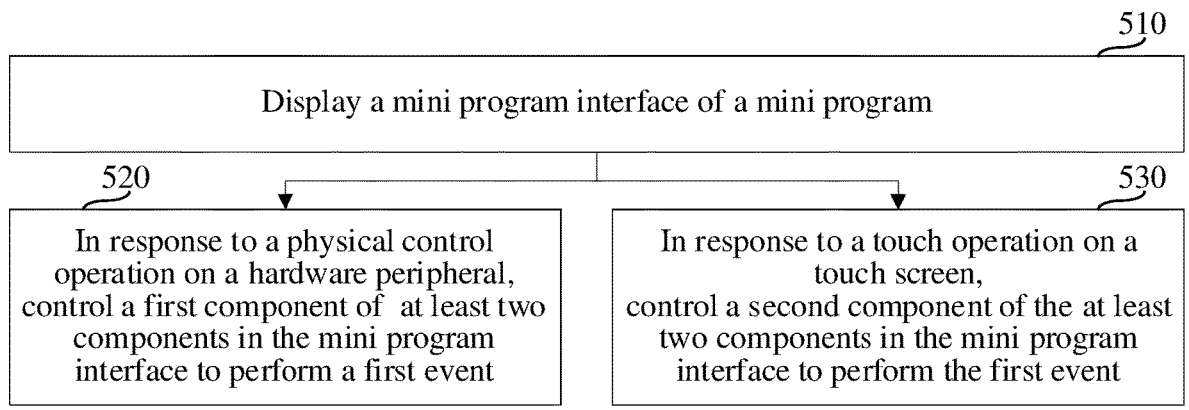
FIG. 5 is a flowchart of a vehicle terminal control method according to an exemplary embodiment of the present disclosure.

FIG. 5 is a flowchart of a vehicle terminal control method according to the present disclosure. The method is performed by a vehicle terminal, the vehicle terminal is provided with a touch screen and a hardware peripheral, and a mini program relying on a mini program engine is run in the vehicle terminal. This method includes:

Step 510: Display a mini program interface of a mini program.

One or more mini programs are run on the vehicle terminal. The mini program interface is a user interface during the running of the mini program.

Exemplarily, the mini program is based on a web architecture, so that the mini program interface is usually a web page. The mini program interface includes at least two components. The components include, but are not limited to: at least one of view, texts, images, media, swiper view, scroll-view, forms, navigation, maps, and canvas.

The mini program is a program relying on a host program to run. The mini program may be a web application.

Step 520: Control a first component in at least two components in the mini program interface to perform a first event in response to a physical control operation on the hardware peripheral.

Exemplarily, the hardware peripheral includes, but is not limited to, at least one of a hardware knob, a hardware toggle button, a hardware touch pad, and a hardware button; and the foregoing four kinds of hardware may be combined to obtain a new hardware. For example, the rotation tap button shown in the above description is formed by combining the hardware knob and the hardware button, and the rotation tap button can support the rotation operation, and can also support a press operation.

Specifically, the hardware peripheral with a control function includes: at least one of a hardware knob, a hardware toggle button, and a hardware touch pad.

In response to that the hardware peripheral includes the hardware knob, the hardware knob supports a counterclockwise rotation operation and a clockwise rotation operation.

In response to that the hardware peripheral includes the hardware toggle button, the hardware toggle button supports toggling operations in at least two directions such as up, down, left, and right. In response to that the hardware peripheral includes the hardware touch pad, the hardware touch pad supports touch operations in at least two directions such as up, down, left, and right.

Specifically, the hardware peripheral with a confirm function includes: a hardware button. Exemplarily, the hardware button supports the confirmation operation.

In response to that the hardware peripheral includes the hardware button, the hardware button supports a press operation.

Exemplarily, the first event performed by the first component includes, but is not limited to, at least one of the following: performing a response event, being in a focus state, losing the focus state, scrolling display, and closing the display.

Step 530: Control a second component of the at least two components in the mini program interface to perform the first event in response to a touch operation on the touch screen.

Exemplarily, the touch operation on the touch screen includes, but is not limited to, at least one of the following: slide, tap down, and tap up.

It is to be noted that, step 520 in the present disclosure may be performed before, after or at the same time with step 530, which is not limited by the present disclosure, that is, the vehicle terminal may be controlled first by the touch operation, may also be controlled first by the physical control operation, and may also be controlled by the two operation methods at the same time.

In this manner, the method provided in this embodiment controls the mini program by using the hardware peripherals such as the physical knob, the physical toggle button, the hardware button, and the like; the mini program can be controlled by the hardware peripheral and the touch screen at the same time, and a safe control method is provided on the vehicle terminal; and this function may be used for all mini programs without modifying the mini programs in a specific specification by the development personnel, and a suitable solution for applying the mini program to the vehicle terminal at low cost is provided.

Figure 6:
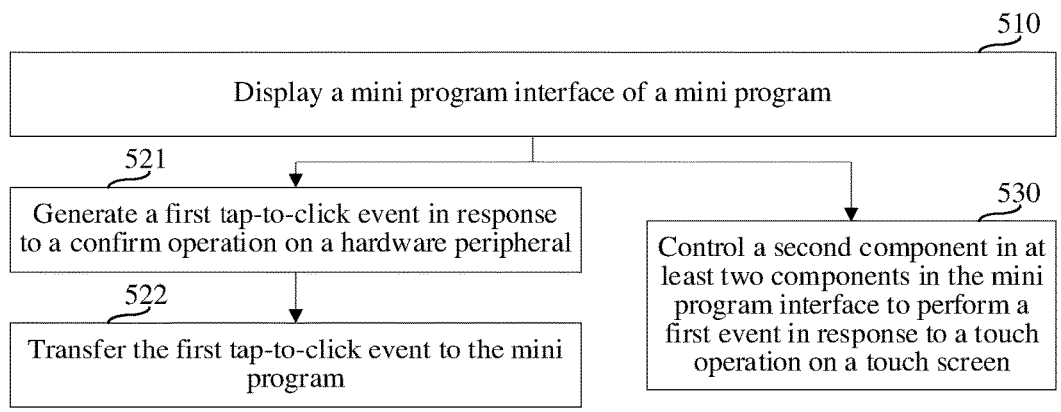
FIG. 6 is a flowchart of a vehicle terminal control method according to an exemplary embodiment of the present disclosure.

Referring to the above four human-computer interaction modes based on the hardware peripheral in the above vehicle terminal control process, the vehicle terminal control method is introduced through the following embodiments:

Corresponding to the human-computer interaction mode I based on the hardware peripheral in the vehicle terminal control process, FIG. 6 is a flowchart of a vehicle terminal control method according to the present disclosure. The method may be performed by the vehicle terminal; specifically, the method may also be run by a script program in the vehicle terminal, the vehicle terminal is provided with a touch screen and a hardware peripheral, and a mini program relying on a mini program engine is run in the vehicle terminal. In an optional design of the present disclosure, step 520 may be implemented as the following steps:

Step 521: Generate a first tap-to-click event in response to a confirmation operation on the hardware peripheral.

The first tap-to-click event is used for controlling a focus component to perform a response event, the focus component is a component that is in a focus state before receiving the confirmation operation, and the focus component corresponds to a focus node.

A touch coordinate in the first tap-to-click event belongs to a coordinate range of a first component in the focus state;

in this embodiment, the coordinate range of the first component is usually rectangular, but it is not excluded that the coordinate range is circular, elliptical, fan-shaped or in other polygonal shapes.

Step 522: Transfer the first tap-to-click event to the mini program.

The first tap-to-click event is used for triggering the mini program to control the first component to perform the response event.

Exemplarily, the response event includes, but is not limited to, at least one of the following: returning to an upper interface of the mini program interface, skipping to a lower interface of the mini program interface, skipping to a first position in the mini program interface, skipping to a first web site, and performing a corresponding function of the first component.

For example, in response to that the first component is a video pause component, performing the response event is to pause the video play; in response to that the first component is a back component, performing the response event is to return to the upper interface of the mini program interface; and in response to that the first component is a web site link of a web site A, performing the response event is to skip to the web site A.

In an exemplary embodiment, step 521 at least has the following three implementation modes.

Implementation mode I: In response to a confirmation operation on the hardware peripheral, a first touch coordinate is generated based on a first reference point in the coordinate range of the first component.

The touch coordinate is used for determining a component corresponding to the confirmation operation on the hardware peripheral.

For example, in response to that the first touch coordinate is located in a coordinate range of a component A, it is determined that the confirmation operation on the hardware peripheral corresponds to the component A.

In response to that the first component does not include a sub-component, a first tap-to-click event is generated based on the first touch coordinate.

Exemplarily, the first reference point is a reference point in the coordinate range of the first component; preferably, the first reference point is a center point in the coordinate range of the first component; and the first tap-to-click event is generated based on the first touch coordinate, that is, the first component is controlled to perform the response event by simulating the tap on a first touch point.

Implementation mode II: In response to the confirmation operation on the hardware peripheral, the first touch coordinate is generated based on the first reference point inside the coordinate range of the first component.

In response to that the first component includes a sub-component, and the first touch coordinate does not belong to the coordinate range of the sub-component, the first tap-to-click event is generated based on the first touch coordinate. Or, in response to that the first component includes a sub-component, and the first touch coordinate belongs to the coordinate range of the sub-component, a second touch coordinate is re-generated based on the coordinate range of the sub-component; and the first tap-to-click event is generated based on the second touch coordinate.

In one embodiment, the coordinate range of the sub-component is contained in the coordinate range of the first component, or the coordinate range of the sub-component is a proper subset of the coordinate range of the first component.

Figure 7:
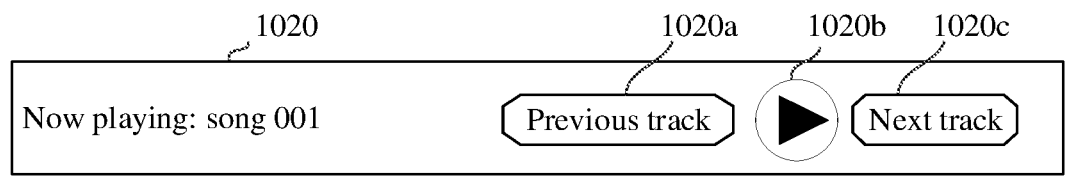
FIG. 7 is a schematic diagram of a music playback component according to an exemplary embodiment of the present disclosure.

For example, FIG. 7 is a schematic diagram of a music playback component according to the present disclosure. The music playback component 1020 is provided with three sub-components: a previous track playback component 1020a, a playback start component 1020b, and a next track playback component 1020c; and in response to that the music playback component 1020 is in a focus state, in response to the confirmation operation on the hardware peripheral, the music playback component 1020 is controlled to perform the response event of opening a music playback interface.

In response to that the generated first touch coordinate does not belong to the coordinate range of the sub-component, the case that the previous track playback component 1020a, the playback start component 1020b or the next track playback component 1020c is controlled wrongly to perform the response event of playing a previous track, starting the playing or playing a next track may be avoided. The first tap-to-click event may be generated based on the first touch coordinate.

in response to that the generated first touch coordinate belongs to the coordinate range of the sub-component, the case that the previous track playback component 1020a, the playback start component 1020b or the next track playback component 1020c is controlled wrongly to perform the response event of playing a previous track, starting the playing or playing a next track may be caused; a second touch coordinate needs to be re-generated based on the coordinate range of the sub-component; and the first tap-to-click event is generated based on the second touch coordinate.

Specifically, regenerating the second touch coordinate based on the coordinate range of the sub-component may be implemented as follows: a first boundary of the sub-component and a second boundary of the first component are determined based on the coordinate range of the sub-component and the coordinate range of the first component; and a second reference point between the first boundary of the sub-component and the second boundary of the first component is determined, and the second touch coordinate is generated based on the second reference point.

Exemplarily, the second reference point is a reference point between the first boundary of the sub-component and the second boundary of the first component.

Exemplarily, the first boundary of the sub-component is expressed by a side coordinate of a first direction of the sub-component, and the second boundary of the first component is expressed by a side coordinate of the first component in the same direction.

For example, the first boundary of the sub-component is a leftmost side coordinate of the sub-component, and the second boundary of the first component is a leftmost side coordinate of the first component; and the second reference point is located between the first boundary of the sub-component and the second boundary of the first component, which may ensure that the second reference point is located in the coordinate range of the first component, and prevent the second reference point from being located in the coordinate range of the sub-component.

Implementation mode III: In response to a confirmation operation on the hardware peripheral, a coordinate range of the first component and a coordinate range of a sub-component in the first component are acquired.

A third reference point located in the coordinate range of the first component and outside the coordinate range of the sub-component is determined; and a third touch coordinate is generated based on the third reference point, and a first tap-to-click event is generated based on the third touch coordinate.

Exemplarily, the third reference point is a reference point in the coordinate range except the coordinate range of the sub-component in the coordinate range of the first component.

In response to that the first component includes the sub-component, the third reference point located in the coordinate range of the first component and outside the coordinate range of the sub-component is determined first, and then the third touch coordinate is generated directly based on the third reference point; and exemplarily, a coordinate point closest to a coordinate origin in the coordinate range of the first component is connected with a coordinate point closest to a coordinate origin in the coordinate range of the sub-component, and a middle point of the connection is determined as the third reference point.

As such, the method provided in this embodiment controls the mini program by using the hardware peripheral; the mini program can be controlled by the hardware peripheral and the touch screen at the same time, and a safe control method is provided on the vehicle terminal; and in response to the confirmation operation on the hardware peripheral, the first component is controlled to perform the response event, so that a corresponding vehicle terminal control method on the hardware peripheral is provided for the touch confirm event, and the touch operation is connected with the physical control operation on the hardware peripheral.

Figure 8:
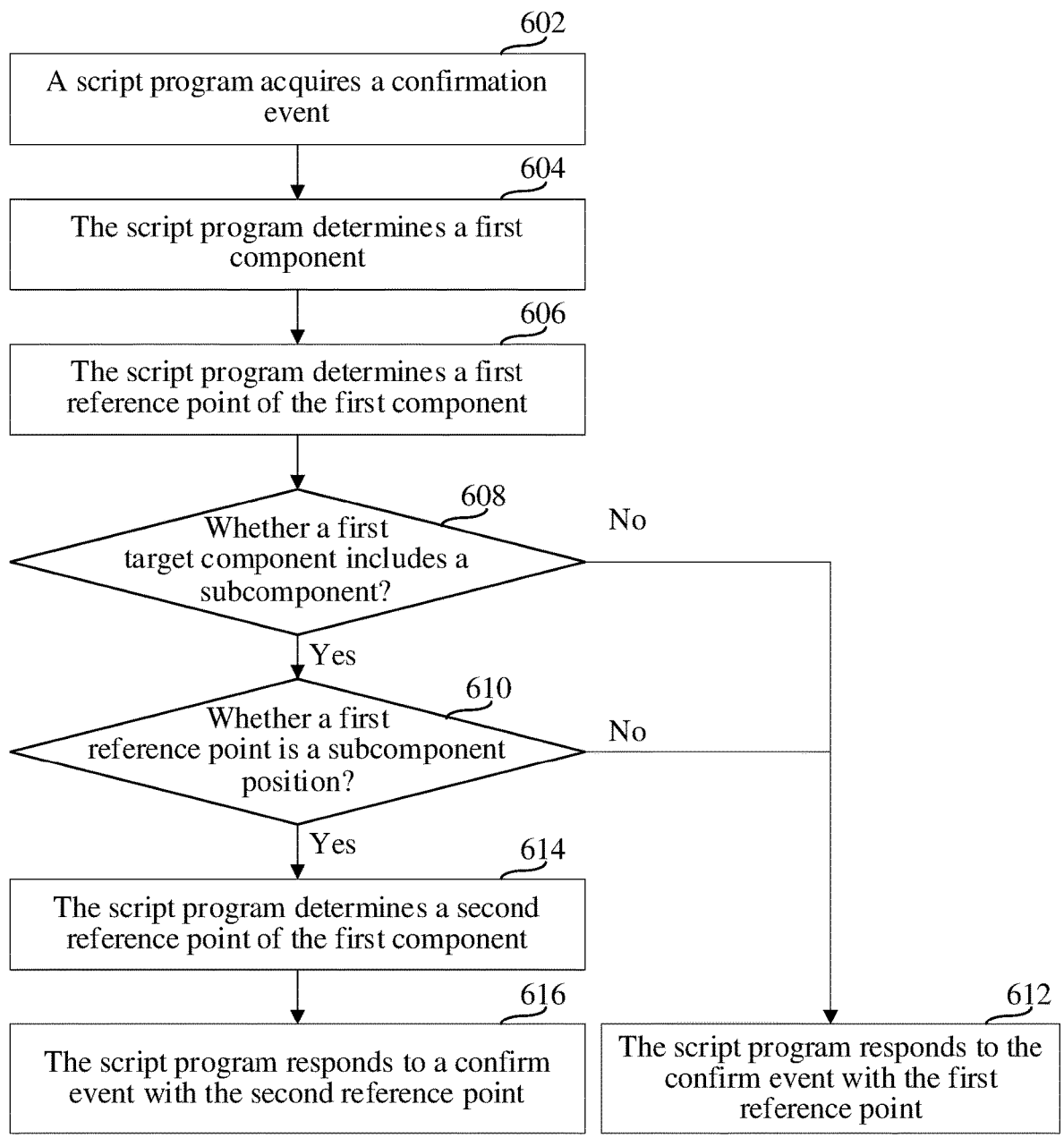
FIG. 8 is a flowchart of a vehicle terminal control method according to an exemplary embodiment of the present disclosure.

FIG. 8 is a flowchart of a vehicle terminal control method according to the present disclosure. The method may be performed by a vehicle terminal; and specifically, the method may also be run by a script program in the vehicle terminal, the vehicle terminal is provided with a touch screen and a hardware peripheral, and a mini program relying on a mini program engine is run in the vehicle terminal. This method includes:

Step 602: A script program acquires a confirm event.

The confirm event is an event generated based on a confirmation operation on the hardware peripheral, and is used for indicating that the confirmation operation is triggered on the hardware peripheral.

Step 604: The script program determines a first component.

The first component is a component in a focus state, that is, in response to that the confirmation operation is performed on the hardware peripheral, the first component in the focus state performs a response event.

Step 606: The script program determines a first reference point of the first component.

The first reference point is used for generating a corresponding tap-to-click event, and the tap-to-click event controls the first component in the focus state to perform the response event.

Exemplarily, the first reference point is determined according to a coordinate range of the first component, and the first reference point is in the coordinate range of the first component.

Step 608: The script program judges whether the first component includes the sub-component.

Exemplarily, the coordinate range of the sub-component is located in the coordinate range of the first component, but it is not excluded that the coordinate range of some sub-components is beyond the coordinate range of the first component.

In response to that the first component includes the sub-component, step 610 is performed.

In response to that the first component does not include the sub-component, step 612 is performed.

Step 610: The script program judges whether a first reference point is a sub-component position.

Exemplarily, in response to that the first component includes the sub-component, whether the first reference point is located in the coordinate range of the sub-component is judged.

In response to that the first reference point is the sub-component position, step 614 is performed.

In response to that the first reference point is not the sub-component position, step 612 is performed.

Step 612: In response to that the first component does not include a sub-component, or in response to that the first component includes the sub-component, and the first reference point is not the sub-component position, the script program responds to a confirm event with the first reference point; through the judgment in the steps 608 and 610, in response to that the first component does not include the sub-component, or in response to that the first component includes the sub-component, and the first reference point is not the sub-component position, the sub-component may not be triggered by mistake. The tap-to-click event is generated based on the first reference point, and the first component in the focus state is controlled by the tap-to-click event to perform the response event.

Step 614: In response to that the first component includes the sub-component and the first reference point is the sub-component position, the script program determines a second reference point of the first component.

Through the judgment in the steps 608 and 610, in response to that the first component includes the sub-component, and the first reference point is the sub-component position, the sub-component may be triggered by mistake; and the second reference point needs to be re-determined.

The second reference point is determined based on the coordinate range of the first component and the coordinate range of the sub-component, and the second reference point is located in the coordinate range of the first component and located outside the coordinate range of the sub-component.

Step 616: The script program responds to the confirm event with the second reference point.

The tap-to-click event is generated based on the second reference point, which avoids wrongly triggering the sub-component to perform the response event; and the first component in the focus state is controlled to perform the response event.

As disclosed, the method provided in this embodiment controls the mini program by using the hardware peripheral; the mini program can be controlled by the hardware peripheral and the touch screen at the same time, and a safe control method is provided on the vehicle terminal; and in response to the confirmation operation on the hardware peripheral, the first component is controlled to perform the response event, so that a corresponding vehicle terminal control method on the hardware peripheral is provided for the touch confirm event, and the touch operation is connected with the physical control operation on the hardware peripheral.

Figure 9:
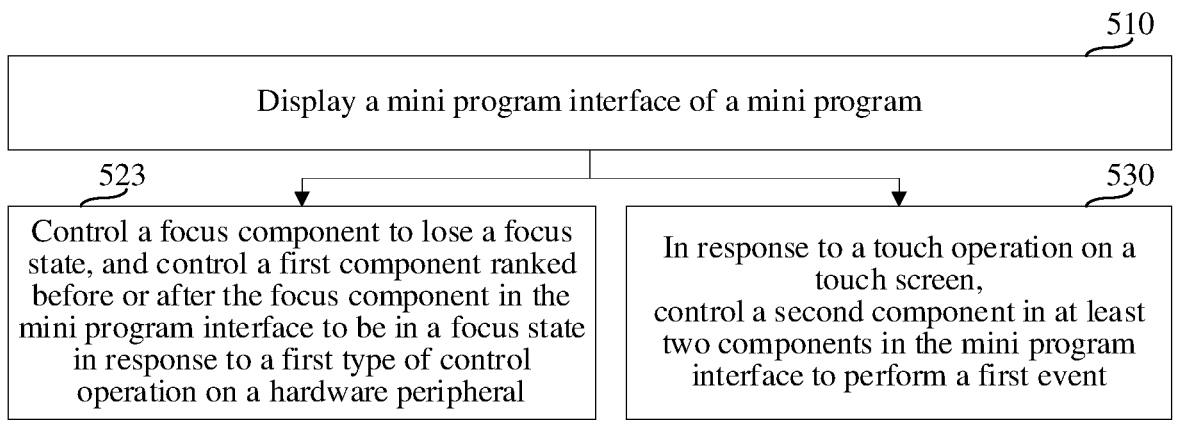
FIG. 9 is a flowchart of a vehicle terminal control method according to an exemplary embodiment of the present disclosure.

Corresponding to the human-computer interaction mode II based on the hardware peripheral in the vehicle terminal control process, FIG. 9 is a flowchart of a vehicle terminal control method according to the present disclosure. The method may be performed by a vehicle terminal; and specifically, the method may also be run by a script program in the vehicle terminal, the vehicle terminal is provided with a touch screen and a hardware peripheral, and a mini program relying on a mini program engine is run in the vehicle terminal. In an optional design of the present disclosure, step 520 may be implemented as the following steps:

Step 523: Control a focus component to lose a focus state, and control a first component ranked before or after the focus component in a mini program interface to be in the focus state in response to a first type of control operation on the hardware peripheral.

The focus component is a component that is in the focus state before receiving the first type of control operation; and exemplarily, the first component in the focus state is displayed on the mini program interface in a highlight manner.

For the display on the mini program interface corresponding to step 523, refer to the human-computer interaction mode II based on the hardware peripheral in the schematic scene diagram shown in FIG. 2.

Figure 10:
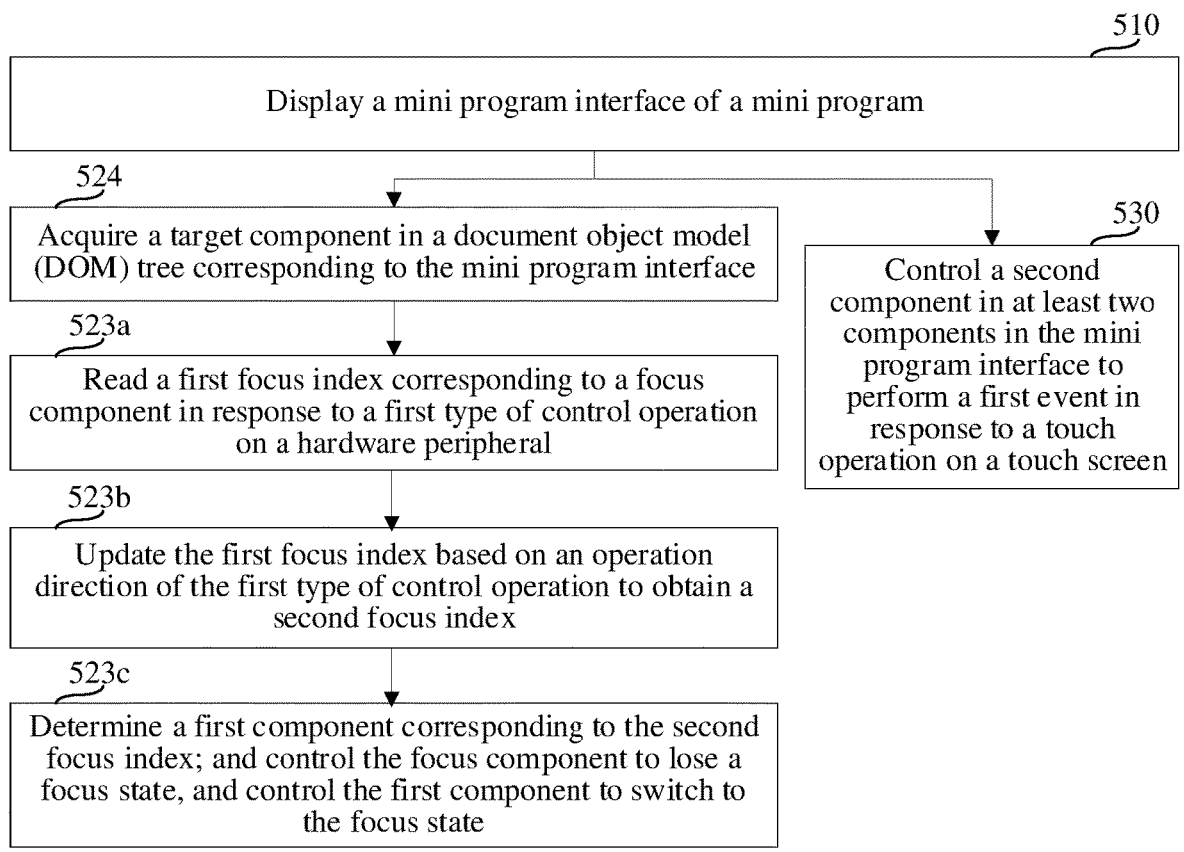
FIG. 10 is a flowchart of a vehicle terminal control method according to an exemplary embodiment of the present disclosure.

In an exemplary embodiment, as shown in FIG. 10, on the basis of the embodiment shown in FIG. 9, step 524 may also be included. Step 523 may be implemented as step 523*a*, step 523*b*, and step 523*c*;

Step 524: Acquire a first node in a document object model tree corresponding to the mini program interface.

The first node includes an event node and a focus node, the event node is a node corresponding to a component with a function of responding to the physical control operation and/or the touch operation, and the focus node is a node corresponding to the focus component in the focus state; and exemplarily, the focus node is usually one of the event nodes, but it is not excluded that the focus node is a node other than the event node.

It is to be noted that, a performing order of the step 524 and a first branch in this embodiment is not limited, that is, the step 524 may be performed before, after or at the same with any step in the first branch, and the first branch includes step 523*a*, step 523*b*, and step 523*c*.

Step 523*a*: Read a first focus index corresponding to the focus component in response to a first type of control operation on the hardware peripheral.

The first focus index is used for indicating index information of the focus component; and exemplarily, the first focus index is determined according to a node position of the focus node corresponding to the focus component in the mini program.

Step 523*b*: Update the first focus index based on an operation direction of the first type of control operation to obtain a second focus index.

Exemplarily, the second focus index is usually a previous or a next focus index of the first focus index; however, it is not excluded that there are other correlations between the second focus index and the first focus index.

Exemplarily, in response to that the operation direction of the first type of control operation is a first direction, the first focus index is added by one to obtain the second focus index; for example, in response to that the first type of control operation is to toggle a lateral toggle button, the operation direction is the first direction of toggling to the right; when toggling the lateral toggle button to the right, the first focus index is added by one to obtain the second focus index.

in response to that the operation direction of the first type of control operation is a second direction, the first focus index is subtracted by one to obtain the second focus index; similarly, in response to that the first type of control operation is to toggle the lateral toggle button, the operation direction is the first direction of toggling to the left; and when toggling the lateral toggle button to the left, the first focus index is subtracted by one to obtain the second focus index.

Step 523*c*: Determine a first component corresponding to the second focus index; and control the focus component to lose the focus state, and control the first component to switch to the focus state.

The second focus index corresponds to a component, the component corresponding to the second focus index is determined as the first component, the focus component is controlled to lose the focus state, and the first component is controlled to switch to the focus state. Exemplarily, the first component in the focus state is displayed on the mini program interface in a highlight manner.

The method provided in this embodiment controls the mini program by using the hardware peripheral; the mini program can be controlled by the hardware peripheral and the touch screen at the same time, and a safe control method is provided on the vehicle terminal; and in response to the first type of control operation on the hardware peripheral, the component is controlled to switch, so that the first component is in the focus state. A corresponding vehicle terminal control method on the hardware peripheral is provided for a touch switching event, and the touch operation is connected with the physical control operation on the hardware peripheral.

On the basis of the embodiment shown in FIG. 9, a process of acquiring a first node is introduced below, that is, in an optional design of the foregoing embodiment, step 524 may be implemented as the following sub-steps:

Sub-step 1: Screen an event node among all nodes of a mini program interface.

Exemplarily, the event node is screened among all nodes of the mini program interface according to a screening condition; and the screening condition includes at least one of the following:

a node registered with an event response method; and exemplarily, the event response method includes, but is not limited to, at least one of the following: returning to an upper interface of the mini program interface, skipping to a lower interface of the mini program interface, skipping to a first position in the mini program interface, skipping to a first website, and performing a corresponding function of the first component;

a page navigator node with a uniform resource locator (URL) not being empty; exemplarily, the page navigator node is registered with an event of skipping to a website indicated by the URL;

an input node; exemplarily, the input node is used for inputting content; and a scroll-view node; and exemplarily, the scroll-view node is used for scrolling the mini program interface or a scroll component corresponding to the scroll-view node supports the scroll-display.

Figure 11:
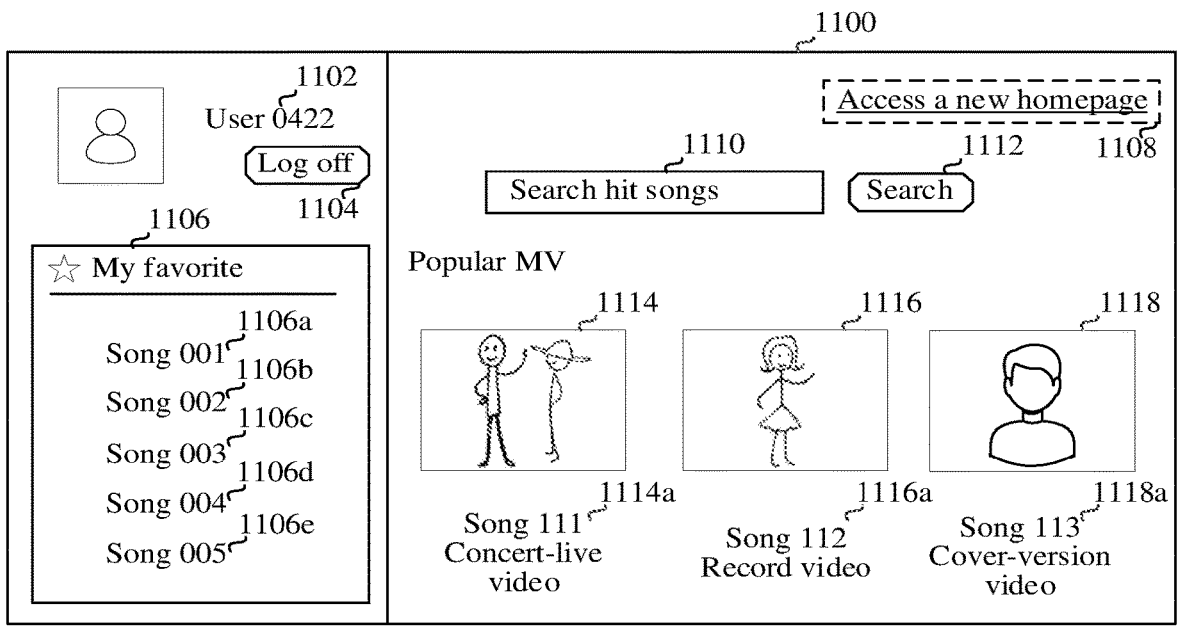
FIG. 11 is a schematic diagram of a mini program interface according to an exemplary embodiment of the present disclosure.

FIG. 11 is a schematic diagram of a mini program interface according to an exemplary embodiment of the present disclosure; a mini program interface 1100 includes a user information component 1102, a log-off component 1104, a my-favorite song component 1106, a new homepage access component 1108, a search input component 1110, a search component 1112, a first video coverage picture component 1114, a second video coverage picture component 1116, a third video coverage picture component 1118, a first video word component 1114*a*, a second video word component 1116*a*, and a third video word component 1118*a*; and the my-favorite song component 1106 includes five sub-components: a song-001 component 1106*a*, a song-002 component 1106*b*, a song-003 component 1106*c*, a song-004 component 1106*d*, and a song-005 component 1106*e*.

The node corresponding to the user information component 1102 does not satisfy the screening condition; the node corresponding to the log-off component 1104 is registered with a log-off event response method, which satisfies the screening condition; the node corresponding to the my-favorite song component 1106 is registered with a bind-tap event response method, which satisfies the screening condition; the nodes corresponding to the sub-components of the my-favorite song component 1106 are registered with a cache-tap event response method, which satisfy the screening condition; the node corresponding to the new homepage access component 1108 is a page navigator node with a URL not being empty and with a response event of skipping to the new homepage, which satisfies the screening condition; the node corresponding to the search input component 1110 is an input node, which satisfies the screening condition; the node corresponding to the search component 1112 is registered with a song search event response method, which satisfies the screening condition; the nodes corresponding to the first video coverage picture component 1114, the second video coverage picture component 1116, and the third video coverage picture component 1118 are video-coverage-play-button image nodes registered with a video playback event response method, which satisfy the screening condition; and the first video word component 1114*a*, the second video word component 1116*a*, and the third video word component 1118*a* are merely word introduction for a first video to a third video, which do not satisfy the screening condition.

Sub-step 2: Determine a focus node among the event nodes.

Exemplarily, the focus node is determined among the event nodes according to a first type of control operation on the hardware peripheral.

Sub-step 3: Acquire node states of the event node and the focus node; and update the focus node according to the change of the node state, The focus node is updated in response to that the node state changes; and for example, the focus node is updated as the node corresponding to the first component in response to that the focus component loses the focus state, and the first component is in the focus state.

On the basis of the embodiment shown in FIG. 9, the first component is further introduced below, that is, in an optional design of the foregoing embodiment, the following sub-steps are further included:

In response to that the first component does not include a sub-component, and the first component is incompletely displayed in the mini program interface, the first component is controlled to scroll for display on the mini program interface based on an operation direction of the first type of control operation; and exemplarily, the first component is a long text component, and the first component does not include a self component; moreover, because there are a lot of word content in the first component, the first component cannot be completely displayed on the mini program interface; and based on the operation direction of the first type of control operation, the first component is controlled to scroll for display on the mini program interface, which facilitates the display of the content of the first component.

Exemplarily, the direction in which the first component is scrolled to display is determined based on the operation direction of the first type of control operation; and for example, in response to that the operation direction of the first type of control operation is a first direction, the first component is scrolled downward for display; and in response to that the operation direction of the first type of control operation is a second direction, the first component is scrolled upward for display.

Figure 12:
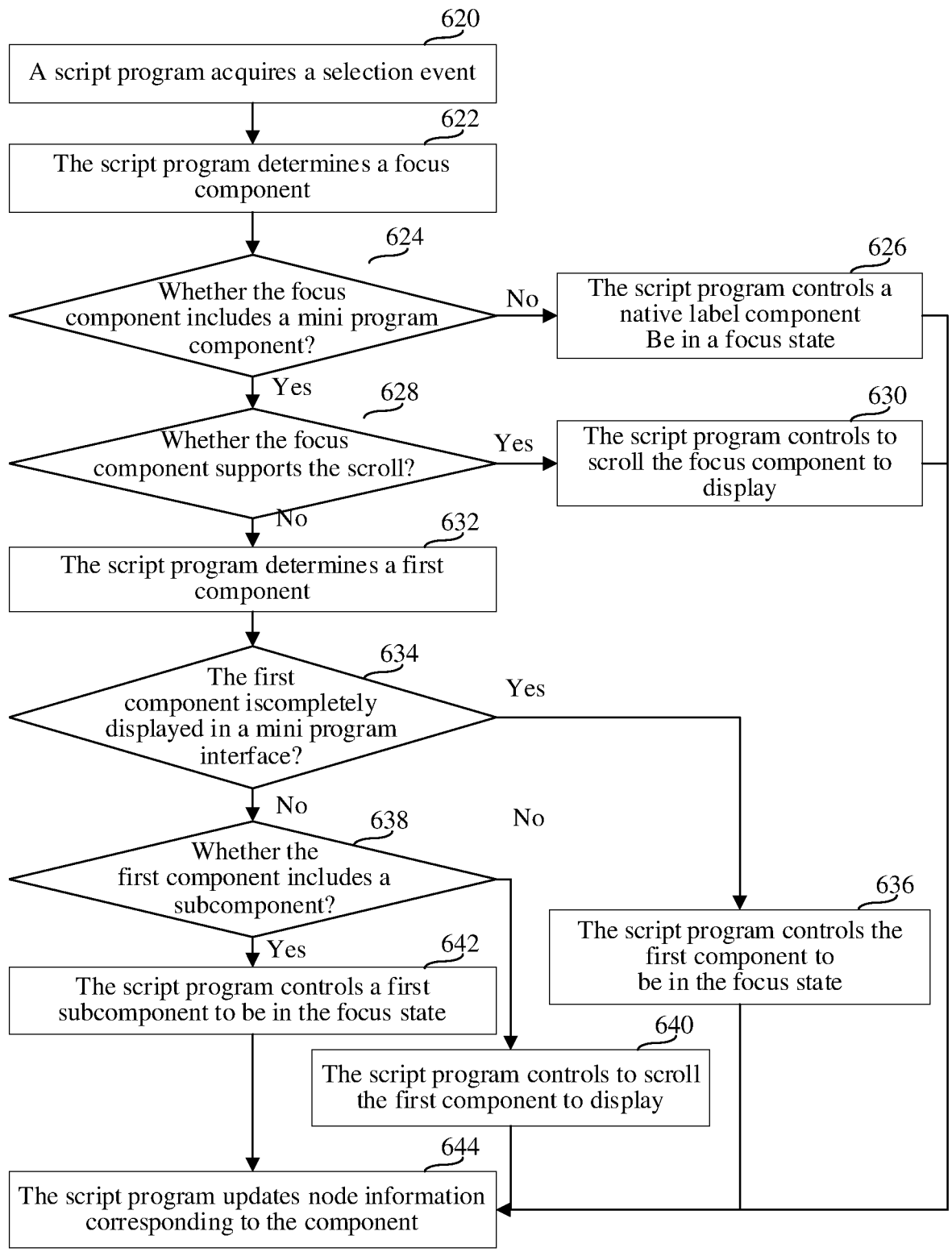
FIG. 12 is a flowchart of a vehicle terminal control method according to an exemplary embodiment of the present disclosure.

FIG. 12 is a flowchart of a vehicle terminal control method according to the present disclosure. The method may be performed by a vehicle terminal; and specifically, the method may also be run by a script program in the vehicle terminal, the vehicle terminal is provided with a touch screen and a hardware peripheral, and a mini program relying on a mini program engine is run in the vehicle terminal. This method includes:

Step 620: A script program acquires a selection event.

The selection event is an event generated based on a first type of control operation on the hardware peripheral, and is used for indicating that the first type of control operation is triggered on the hardware peripheral.

Step 622: The script program determines a focus component.

The focus component is a component that is in a focus selected state before acquiring a selection time.

Step 624: The script program judges whether the focus component includes a mini program component.

The case that the focus component includes the mini program component includes, but is not limited to, at least one of the following: a focus node is not registered with an event response method; and the content of the focus node is empty.

In response to that the focus component does not include the mini program component, step 626 is performed.

In response to that the focus component includes the mini program component, step 628 is performed;

Step 626: In response to that the focus component does not include the mini program component, the script program controls a native label component to be in a focus state.

In response to that the focus component does not include the mini program component, the component state of the focus component cannot be updated, and the native label component corresponding to the focus component is controlled to be in the focus state.

Step 628: In response to that the focus component includes the mini program component, the script program judges whether the focus component supports the scroll.

Exemplarily, a node corresponding to the focus component supporting the scroll is a scroll-view node.

In response to that the focus component supports the scroll, step 630 is performed.

In response to that the focus component does not support the scroll, step 632 is performed.

Step 630: In response to that the focus component supports the scroll, the script program controls the focus component to scroll for display.

The focus component supporting the scroll is scrolled to display; exemplarily, a scroll direction of the focus component is determined according to an operation direction of the first type of control operation; for example, in response to that the operation direction of the first type of control operation is a first direction, the focus component is scrolled downward; and in response to that the operation direction of the first type of control operation is a second direction, the focus component is scrolled upward.

Step 632: In response to that the focus component does not support the scroll, the script program determines a first component.

Exemplarily, the first component is usually a component before or after the focus component; the first component is determined according to the operation direction of the first type of control operation and a focus index of the focus component; exemplarily, in response to that the operation direction of the first type of control operation is the first direction, the first focus index is added by one to obtain a second focus index, and the second focus index is used for indicating the first component; and similarly, in response to that the operation direction of the first type of control operation is the second direction, the first focus index is subtracted by one to obtain the second focus index, and the second focus index is used for indicating the first component.

It is to be noted that, in a process that the first type of control operation instructs to calculate the first focus index to obtain the second focus index, it is possible that the second focus index cannot be obtained; for example, the first focus index indicates a last component in the mini program interface, and in response to that the first type of control operation indicates that the last component is determined, the second focus index cannot be obtained; and in response to that the second focus index cannot be obtained, the processing for the selection event is ended. That is, the focus component is kept in the focus state.

Step 634: The script program judges whether the first component is completely displayed in the mini program interface.

Whether the first component is completely displayed in the mini program interface, and in response to that the first component has a lot of content, the first component may not be displayed completely in the mini program interface; and for example, the first component is a word component, the word component includes seven rows of word content, and there is a display space only displaying five rows of word content in the mini program interface.

In response to that the first component is completely displayed in the mini program interface, step 636 is performed; and in response to that the first component is incompletely displayed in the mini program interface, step 638 is performed;

Step 636: In response to that the first component is completely displayed in the mini program interface, the script program controls the first component to be in a focus state.

The first component is controlled to be in the focus state; and in one embodiment, the focus component is controlled to lose the focus state.

Step 638: In response to that the first component is incompletely displayed in the mini program interface, the script program judges whether the first component includes a sub-component.

Exemplarily, a coordinate range of the sub-component is located in the coordinate range of the first component, but it is not excluded that the coordinate range of some sub-components is beyond the coordinate range of the first component.

In response to that the first component includes the sub-component, step 642 is performed.

In response to that the first component does not include the sub-component, step 640 is performed.

Step 640: In response to that the first component does not include the sub-component, the script program controls the first component to scroll for display.

In response to that the first component does not include the sub-component, in order to completely display the content of the first component in the mini program interface, the first component is scrolled to display; and it is to be noted that, the scroll display in this step is to completely display the content of the first component; and the foregoing scroll display for the component corresponding to the scroll-view node is a response event of the component for performing the scroll display.

Step 642: In response to that the first component includes the sub-component, the script program controls a first sub-component to be in a focus state.

The first sub-component is determined according to an operation direction of the first type of control operation; exemplarily, in response to that the operation direction of the first type of control operation is a first direction, a first focus index is added by one to obtain a second focus index, and the first sub-component is a first sub-component in the first component; and in response to that the operation direction of the first type of control operation is a second direction, the first focus index is subtracted by one to obtain the second focus index, and the first sub-component is a last sub-component in the first component.

Step 644: In response to that the component state of the component changes, a script program updates node information corresponding to the component.

In response to that the node state changes, the focus node is updated; and for example, the focus node is updated as the node corresponding to the first component in response to that the focus component loses the focus state, and the first component is in the focus state. As disclosed, the method provided in this embodiment controls the mini program by using the hardware peripheral; the mini program can be controlled by the hardware peripheral and the touch screen at the same time, and a safe control method is provided on the vehicle terminal; and in response to the first type of control operation on the hardware peripheral, the component is controlled to switch, so that the first component is in the focus state, a corresponding vehicle terminal control method on the hardware peripheral is provided for the touch switching event, and the touch operation is connected with the physical control operation on the hardware peripheral.

Figure 13:
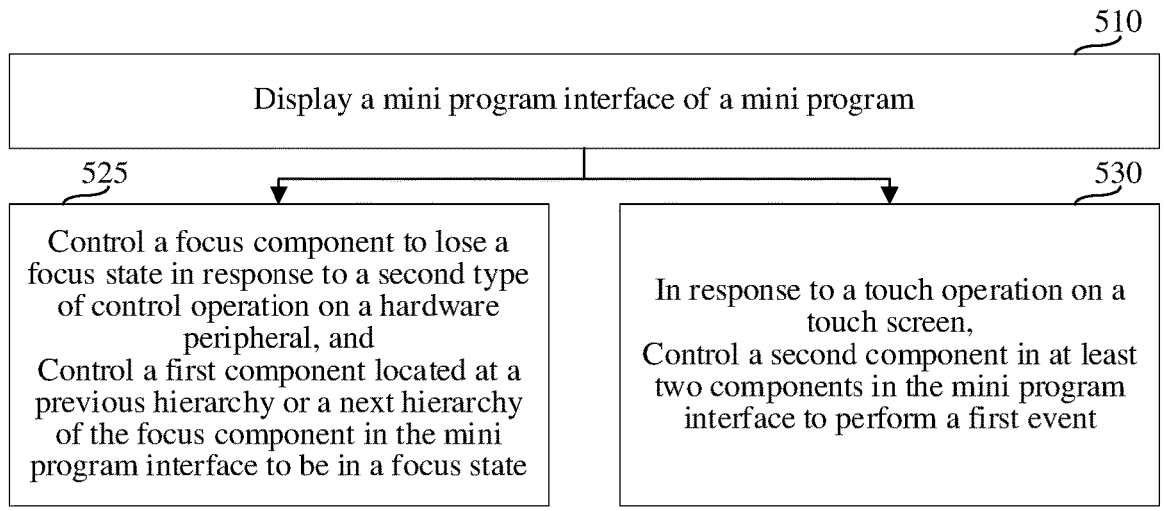
FIG. 13 is a flowchart of a vehicle terminal control method according to an exemplary embodiment of the present disclosure.

Corresponding to the human-computer interaction mode III based on the hardware peripheral in the vehicle terminal control process, FIG. 13 is a flowchart of a vehicle terminal control method according to the present disclosure. The method may be performed by a vehicle terminal; and specifically, the method may also be run by a script program in the vehicle terminal, the vehicle terminal is provided with a touch screen and a hardware peripheral, and a mini program relying on a mini program engine is run in the vehicle terminal. In an optional design of the present disclosure, step 520 may be implemented as the following steps:

Step 525: Control a focus component to lose a focus state, and control a first component located at a previous hierarchy or a next hierarchy of the focus component in a mini program interface to be in the focus state in response to a second type of control operation on the hardware peripheral.

The focus component is a component that is in the focus state before receiving the second type of control operation; and exemplarily, the first component in the focus state is displayed on the mini program interface in a highlight manner.

For the display on the mini program interface corresponding to step 525, refer to the human-computer interaction mode III based on the hardware peripheral in the schematic scene diagram shown in FIG. 2.

Figure 14:
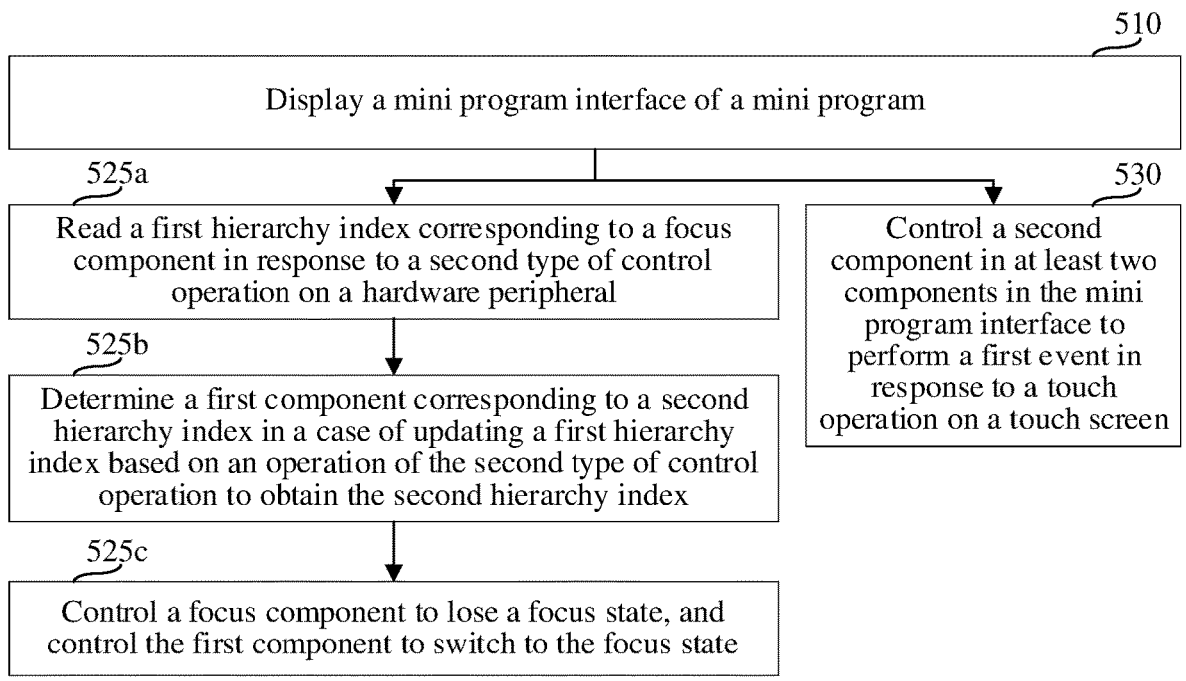
FIG. 14 is a flowchart of a vehicle terminal control method according to an exemplary embodiment of the present disclosure.

In an exemplary embodiment, as shown in FIG. 14, step 525 in the embodiment shown in FIG. 13 may be implemented as step 525a, step 525b, and step 525c:

Step 525a: Read a first hierarchy index corresponding to a focus component in response to a second type of control operation on the hardware peripheral.

The first hierarchy index is used for indicating hierarchy information of the focus component; and exemplarily, the first hierarchy index is determined according to a node hierarchy of a focus node corresponding to the focus component in the mini program.

Exemplarily, the hierarchy index of the component is obtained by adding a data-focus index attribute on the node corresponding to the component; and the hierarchy index corresponding to the component may be completed during the design of the mini program, and may also be added for the component by using the vehicle terminal.

Step 525b: When updating the first hierarchy index based on an operation direction of the second type of control operation to obtain a second hierarchy index, determine a first component corresponding to the second hierarchy index.

Exemplarily, the second hierarchy index is usually a previous or a next hierarchy index of the first hierarchy index; however, it is not excluded that there are other correlations between the second hierarchy index and the first hierarchy index.

Exemplarily, in response to that the operation direction of the second type of control operation is a third direction, the first hierarchy index is added by one to obtain a second hierarchy index; and for example, the second type of control operation is to toggle a longitudinal toggle button, and the operation direction is a third direction, and is to toggle downward; when downward toggling the longitudinal toggle button, the first hierarchy index is added by one to obtain the second hierarchy index.

in response to that the operation direction of the second type of control operation is a fourth direction, the first hierarchy index is subtracted by one to obtain the second hierarchy index; for example, the second type of control operation is to toggle the longitudinal toggle button, and the operation direction is the fourth direction and is to toggle upward; when upward toggling the longitudinal toggle button, the first hierarchy index is subtracted by one to obtain the second hierarchy index.

A first component corresponding to the second hierarchy index is determined, a first node is a node corresponding to the second hierarchy index, and in response to that the second hierarchy index corresponds to a plurality of components, how to determine the first component is not limited, and the first component may be determined by a preset condition; an exemplary preset condition includes, but is not limited to, at least one of the following: the first node is a node corresponding to the second hierarchy index that is determined randomly; and the first node is a first node among the nodes corresponding to the second hierarchy index.

In one embodiment, in response to that there is a subordinate relationship between the first hierarchy index and the second hierarchy index, the first component is a component corresponding to the second hierarchy index and having the subordinate relationship with the focus component.

Figure 15:
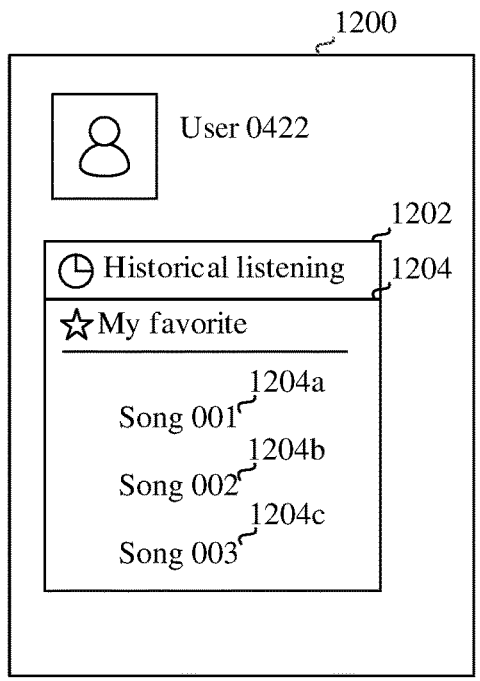
FIG. 15 is a schematic diagram of a mini program interface according to an exemplary embodiment of the present disclosure.

FIG. 15 is a schematic diagram of a mini program interface according to an exemplary embodiment of the present disclosure; the mini program interface 1200 includes: a historical listening list component 1202 and a my-favorite list component 1204, and the historical listening list component 1202 and the my-favorite list component 1204 correspond to a first hierarchy index; and the my-favorite list component 1204 includes sub-components as follows: a song-001 component 1204a, a song-002 component 1204b, and a song-003 component 1204c.

In response to that the song-002 component 1204b is a focus node, in response to upward toggling the longitudinal toggle button, the first component that has the subordinate relationship with the song-002 component 1204b and is located in a previous hierarchy, i.e., the first hierarchy index, of the song-002 component 1204b in the mini program interface is controlled to be in the focus state, and the first component is the my-favorite list component 1204.

In one embodiment, in response to that there is no subordinate relationship between the first hierarchy index and the second hierarchy index, the first component is a first component corresponding to the second hierarchy index.

Referring to the human-computer interaction mode III based on the hardware peripheral in the schematic scene diagram shown in FIG. 2, since a component included in a hot video display area 910 does not have the subordinate relationship with the component included in a hot new display area 920, the first component is the first component corresponding to the second hierarchy index, that is, the first component is a northern city temperature-drop news component 922.

In one embodiment, in response to that the second hierarchy index is not updated successfully, a focus component is controlled to lose a focus state, and a native label corresponding to the focus component is controlled to be in the focus state.

The mini program interface also displays the native label, and the native label is provided by a mini program engine; and exemplarily, the case that the second hierarchy index is not updated successfully includes, but is not limited to, at least one of the following:

a focus node is not registered with an event response method; and the content of the focus node is empty.

In response to that the first hierarchy index is subtracted by one to obtain the second hierarchy index, the first hierarchy index is a top hierarchy.

Figure 16:
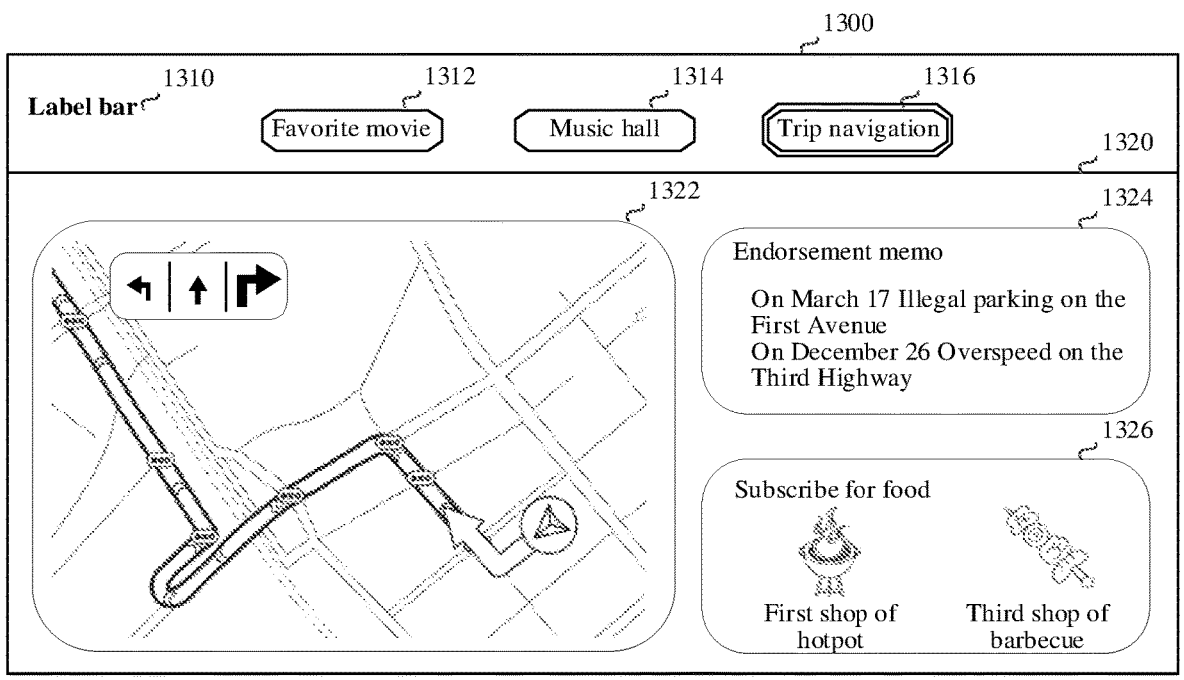
FIG. 16 is a schematic diagram of a mini program interface according to an exemplary embodiment of the present disclosure.

FIG. 16 is a schematic diagram of a mini program interface according to an exemplary embodiment of the present disclosure. The mini program interface 1300 includes a label bar display area 1310, and a trip navigation function display area 1320.

The label bar display area 1310 includes three native labels: a favorite movie label 1312, a music hall label 1314, and a trip navigation label 1316; and content of the trip navigation label 1316 is displayed at the trip navigation function display area 1320.

The trip navigation function display area 1320 includes: a navigation component 1322, a memo component 1324, and a subscription component 1326; the memo component 1324 only displays endorsements, and is not registered with an event response method; and the hierarchy indexes corresponding to both the navigation component 1322 and the subscription component 1326 are top hierarchies.

In response to that a node corresponding to the memo component 1324 is a focus node, in response to a second type of control operation on the hardware peripheral, the second hierarchy index is not updated successfully, the native label, i.e., the trip navigation label 1316, corresponding to the memo component 1324 is controlled to be in the focus state, and the memo component 1324 is controlled to lose the focus state.

In response to that a node corresponding to the navigation component 1322 is a focus node, and the operation direction of the second type of control operation is a fourth direction, the first hierarchy index is subtracted by one to obtain a second hierarchy index; and since the hierarchy index corresponding to the navigation component 1322 is the top hierarchy, and the second hierarchy is not updated successfully, the native label, i.e., the trip navigation label 1316 corresponding to the navigation component 1322 is controlled to be in the focus state, and the navigation component 1322 is controlled to lose the focus state.

Step 525c: Control the focus component to lose the focus state, and control the first component to switch to the focus state.

The second hierarchy index corresponds to a component, the component corresponding to the second hierarchy index is determined as the first component, the focus component is controlled to lose the focus state, and the first component is controlled to switch to the focus state. Exemplarily, the first component in the focus state is displayed on the mini program interface in a highlight manner.

As disclosed, the method provided in this embodiment controls the mini program by using the hardware peripheral; the mini program can be controlled by the hardware peripheral and the touch screen at the same time, and a safe control method is provided on the vehicle terminal; and in response to the second type of control operation on the hardware peripheral, the hierarchy of the component is controlled switch, so that the first component is in the focus state. A corresponding vehicle terminal control method on the hardware peripheral is provided for a touch hierarchy switching event, and the touch operation is connected with the physical control operation on the hardware peripheral.

Figure 17:
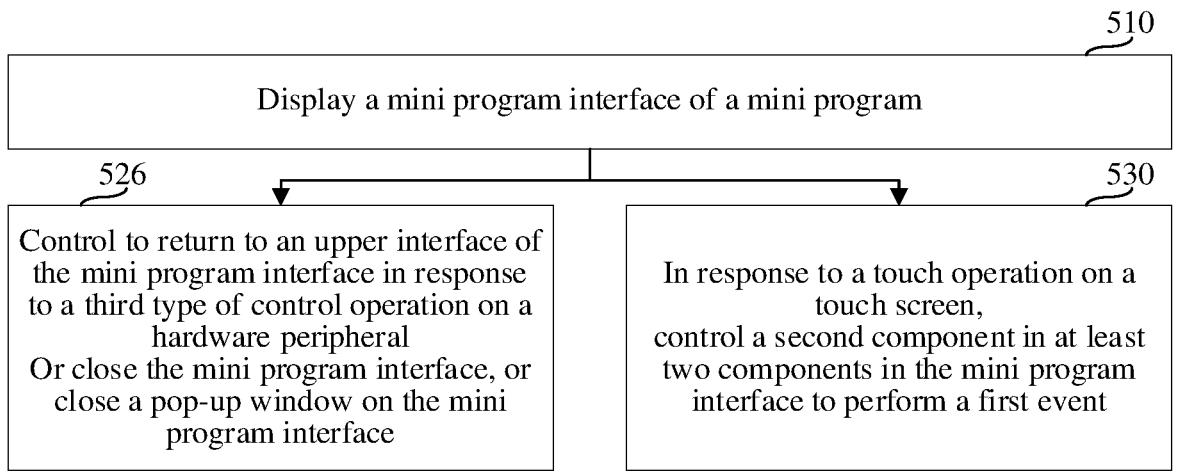
FIG. 17 is a flowchart of a vehicle terminal control method according to an exemplary embodiment of the present disclosure.

Corresponding to the human-computer interaction mode IV based on the hardware peripheral in the vehicle terminal control process, FIG. 17 is a flowchart of a vehicle terminal control method according to the present disclosure. The method may be performed by a vehicle terminal; and specifically, the method may also be run by a script program in the vehicle terminal, the vehicle terminal is provided with a touch screen and a hardware peripheral, and a mini program relying on a mini program engine is run in the vehicle terminal. In an optional design of the present disclosure, step 520 may be implemented as the following steps:

Step 526: Control to return to an upper interface of a mini program interface, or to close the mini program interface, or to close a pop-up window on the mini program interface in response to a third type of control operation on the hardware peripheral.

For the display on the mini program interface corresponding to step 526, refer to the human-computer interaction mode IV based on the hardware peripheral in the schematic scene diagram shown in FIG. 2; exemplarily, the third type of control operation on the hardware peripheral is to counterclockwise rotate a rotation tap button; and the rotation tap button is rotated counterclockwise at the mini program interface, and it is controlled to return to the upper interface of the mini program interface, or to close the mini program interface, or to close the pop-up window on the mini program interface.

In an exemplary embodiment, the step 526 in which the pop-up window on the mini program interface is closed may be implemented as the following steps: a second tap-to-click event is generated in response to the third type of control operation on the hardware peripheral; and the second tap-to-click event is transferred to the mini program.

The second tap-to-click event is used for triggering the mini program to add a data-close pop-up attribute to the node corresponding to the pop-up window, so that the pop-up window is closed. Exemplarily, the mini program adds data-close pop-up attribute is added to the node corresponding to the pop-up window on the mini program interface, and the data-close pop-up attribute indicates that the display of the pop-up window on the min program interface is closed.

Exemplarily, a touch coordinate in the second tap-to-click event belongs to a coordinate range of a closing component of the pop-up window on the mini program interface; and in this embodiment, the coordinate range of the closing component of the pop-up window on the mini program interface is generally rectangular, but it is not excluded that the coordinate range is circular, elliptical, fan-shaped, or in other polygonal shapes. The touch coordinate in the second tap-to-click event is determined based on a fourth reference point in the coordinate range of the closing component of the pop-up window on the mini program interface. The fourth reference point is a reference point in the coordinate range of the closing component; and preferably, the first reference point is a center point in the coordinate range of the closing component.

As disclosed, the method provided in this embodiment controls the mini program by using the hardware peripheral; the mini program can be controlled by the hardware peripheral and the touch screen at the same time, and a safe control method is provided on the vehicle terminal; and in response to the third type of control operation on the hardware peripheral, it is controlled to return to the upper interface of the mini program interface, or to close the mini program interface, or to close the pop-up window on the mini program interface. A corresponding vehicle terminal control method on the hardware peripheral is provided for a touch closing event, and the touch operation is connected with the physical control operation on the hardware peripheral.

An ordinary skilled person in the art may understand that the foregoing embodiments may be implemented independently, and may also be combined freely to obtain a new embodiment implementing the vehicle terminal control method of the present disclosure.

Figure 18:
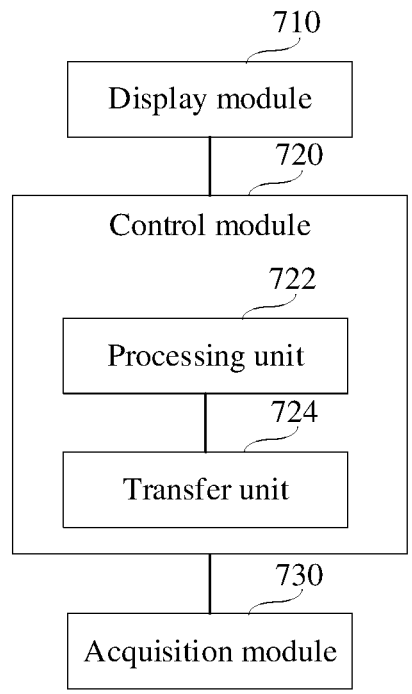
FIG. 18 is a structural block diagram of a vehicle terminal control apparatus according to an exemplary embodiment of the present disclosure.

FIG. 18 is a block diagram of a vehicle terminal control apparatus according to an exemplary embodiment of the present disclosure. The vehicle terminal is provided with a touch screen and a hardware peripheral, and a mini program relying on a mini program engine is run in the vehicle terminal. The apparatus includes: a display module 710, configured to display a mini program interface of the mini program, the mini program interface including at least two components; and a control module 720, configured to control a first component of the at least two components in the mini program interface to perform a first event in response to a physical control operation on the hardware peripheral, and the control module 720 being further configured to control a second component of the at least two components in the mini program interface to perform the first event in response to a touch operation on the touch screen.

In an exemplary embodiment, the control module 720 includes: a processing unit 722, configured to generate a first tap-to-click event in response to a confirmation operation on the hardware peripheral, a touch coordinate in the first tap-to-click event belonging to a coordinate range of the first component in a focus state; and a transfer unit 724, configured to transfer the first tap-to-click event to the mini program, the first tap-to-click event being configured to trigger the mini program to control the first component to perform a response event.

In an exemplary embodiment, the processing unit 722 is also configured to:
  generate a first touch coordinate based on a first reference point in the coordinate range of the first component in response to the confirmation operation on the hardware peripheral; and
  generate the first tap-to-click event based on the first touch coordinate in response to that the first component does not include a sub-component.

In an exemplary embodiment, the processing unit 722 is also configured to:
  generate the first touch coordinate based on the first reference point inside the coordinate range of the first component in response to the confirmation operation on the hardware peripheral; and
  generate the first tap-to-click event based on the first touch coordinate in response to that the first component includes a sub-component, and the first touch coordinate does not belong to the coordinate range of the sub-component; or re-generate a second touch coordinate based on the coordinate range of a sub-component in response to that the first component includes the sub-component, and the first touch coordinate belongs to the coordinate range of the sub-component; and generate the first tap-to-click event based on the second touch coordinate.

In an exemplary embodiment, the processing unit 722 is also configured to:
  determine a first boundary of the sub-component and a second boundary of the first component based on the coordinate range of the sub-component and the coordinate range of the first component; and
  determine a second reference point between the first boundary of the sub-component and the second boundary of the first component, and generate the second touch coordinate based on the second reference point.

In an exemplary embodiment, the processing unit 722 is also configured to:
  acquire the coordinate range of the first component, and the coordinate range of the sub-component in the first component in response to a confirmation operation on the hardware peripheral;
  determine a third reference point located in the coordinate range of the first component and outside the coordinate range of the sub-component; and
  generate a third touch coordinate based on the third reference point, and generate the first tap-to-click event based on the third touch coordinate.

In an exemplary embodiment, the control module 720 is also configured to:
  control a focus component to lose a focus state, and control the first component ranged before or after the focus component in the mini program interface to be in the focus state in response to a first type of control operation on the hardware peripheral, the focus component being a component that is in the focus state before receiving the first type of control operation.

In an exemplary embodiment, the apparatus further includes:
  an acquisition module 730, configured to acquire a first node in a document object model (DOM) tree corresponding to the mini program interface, the first node including an event node and a focus node, the event node being a node corresponding to the component with a function of responding to the physical control operation and/or the touch operation, the focus node being a node corresponding to the focus component in the focus state; and the control module 720 is also configured to:
  read a first focus index corresponding to the focus component in response to the first type of control operation on the hardware peripheral;
  update the first focus index based on an operation direction of the first type of control operation to obtain a second focus index;
  determine the first component corresponding to the second focus index; and control the focus component to lose the focus state, and control the first component to switch to the focus state.

In an exemplary embodiment, the control module 720 is also configured to:
  control the first component on the mini program interface to perform scroll display based on the operation direction of the first type of control operation in response to that the first component does not include the sub-component and the first component is incompletely displayed in the mini program interface.

In an exemplary embodiment, the control module 720 is also configured to:
  add one to the first focus index to obtain the second focus index in response to that the operation direction of the first type of control operation is a first direction; and
  subtract the first focus index by one to obtain the second focus index in response to that the operation direction of the first type of control operation is a second direction.

In an exemplary embodiment, the acquisition module 730 is also configured to:
  screen an event node among all nodes of the mini program interface;
  determine the focus node among the event nodes;
  acquire node states of the event node and the focus node; and update the focus node according to the change of the node state.

In an exemplary embodiment, the acquisition module 730 is also configured to:
  screen the event node among all nodes of the mini program interface according to a screening condition, the screening condition including at least one of the following:
  a node registered with an event response apparatus;
  a page navigator node with a uniform resource location system (URL) not being empty;
  an input node; and
  a scroll-view node.

In an exemplary embodiment, the control module 720 is also configured to:
  control the focus component to lose the focus state, and control the first component located at a previous hierarchy or a next hierarchy of the focus component in the mini program interface to be in the focus state in response to a second type of control operation on the hardware peripheral, the focus component being a component that is in the focus state before receiving the second type of control operation.

In an exemplary embodiment, the control module 720 is also configured to:
  read a first hierarchy index corresponding to the focus component in response to the second type of control operation on the hardware peripheral;

when updating the first hierarchy index based on the operation direction of the second type of control operation to obtain a second hierarchy index; determine the first component corresponding to the second hierarchy index; and control the focus component to lose the focus state, and control the first component to switch to the focus state.

In an exemplary embodiment, in response to that there is a subordinate relationship between the first hierarchy index and the second hierarchy index, the first component is a component corresponding to the second hierarchy index and having the subordinate relationship with the focus component; and in response to that there is no subordinate relationship between the first hierarchy index and the second hierarchy index, the first component is the first component corresponding to the second hierarchy index.

In an exemplary embodiment, the mini program interface also displays a native label, and the native label is provided by the mini program engine; and the control module 720 is also configured to:

control the focus component to lose the focus state, and control the native label corresponding to the focus component to be in the focus state in response to that the second hierarchy index is not updated successfully.

In an exemplary embodiment, the control module 720 is also configured to:

add one to the first hierarchy index to obtain the second hierarchy index in response to that the operation direction of the second type of control operation is a third direction; and subtract the first hierarchy index by one to obtain the second hierarchy index in response to that the operation direction of the second type of control operation is a fourth direction.

In an exemplary embodiment, the control module 720 is also configured to:

control to return to an upper interface of the mini program interface, or to close the mini program interface, or to close a pop-up window on the mini program interface in response to a third type of control operation on the hardware peripheral.

In an exemplary embodiment, the control module 720 is also configured to:

generate a second tap-to-click event in response to the third type of control operation on the hardware peripheral; transfer the second tap-to-click event to the mini program, the second tap-to-click event being configured to trigger the mini program to add a data-close pop-up attribute to a node corresponding to the pop-up window, so that the pop-up window is closed.

It is to be noted that in response to that the apparatus provided in the foregoing embodiment implements the functions of the apparatus, only division of the foregoing function modules is used as an example for description. In the practical application, the functions may be allocated to and completed by different function modules according to actual requirements. That is, an internal structure of the device is divided into different function modules, to complete all or some of the functions described above. The modules may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules.

With regard to the apparatus in the foregoing embodiments, the specific way in which each module performs operations is already described in detail in the method embodiments; and the technical effect obtained by each module performing the operations are the same as the technical effect in the method embodiments, which is not described in detail herein again.

Figure 19:
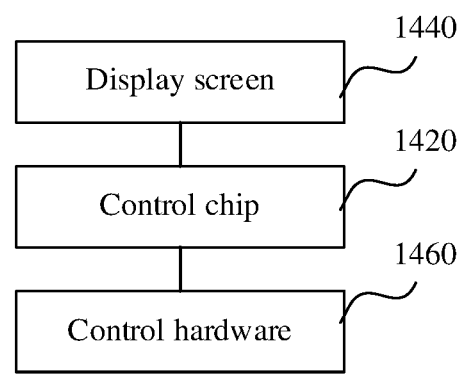
FIG. 19 is a block diagram of a vehicle terminal according to an exemplary embodiment of the present disclosure.

FIG. 19 is a structural block diagram of a vehicle terminal 1400 according to an exemplary embodiment of the present disclosure. The vehicle terminal 1400 includes: a control chip 1420, a display screen 1440 connected with the control chip 1420, and a control hardware 1460;

the display screen 1440 is configured to display a mini program page under the control of the control chip, and the mini program page includes at least two components;

the control hardware 1460 is configured to report a physical control event to the control chip in response to a physical control operation on the hardware peripheral, and report a touch event to the control chip in response to a touch operation on the touch screen;

the control chip 1420 is configured to control a first component of the at least two components in the mini program interface to perform a first event in response to receiving the physical control event, and control a second component of the at least two components in the mini program interface to perform the first event in response to receiving the touch event.

In an exemplary embodiment, the control chip 1420 is also configured to generate a first tap-to-click event in response to a confirmation operation on the hardware peripheral, a touch coordinate in the first tap-to-click event belonging to a coordinate range of the first component in a focus state, and transfer the first tap-to-click event to the mini program, the first tap-to-click event being configured to trigger the mini program to control the first component to perform a response event.

In an exemplary embodiment, the control chip 1420 is also configured to generate a first touch coordinate based on a first reference point in the coordinate range of the first component in response to the confirmation operation on the hardware peripheral; and generate the first tap-to-click event based on the first touch coordinate in response to that the first component does not include a sub-component.

In an exemplary embodiment, the control chip 1420 is also configured to generate the first touch coordinate based on the first reference point inside the coordinate range of the first component in response to the confirmation operation on the hardware peripheral; and generate the first tap-to-click event based on the first touch coordinate in response to that the first component includes a sub-component, and the first touch coordinate does not belong to the coordinate range of the sub-component; or re-generate a second touch coordinate based on the coordinate range of the sub-component in response to that the first component includes the sub-component, and the first touch coordinate belongs to the coordinate range of the sub-component; and generate the first tap-to-click event based on the second touch coordinate.

In an exemplary embodiment, the control chip 1420 is also configured to determine a first boundary of the sub-component and a second boundary of the first component based on the coordinate range of the sub-component and the coordinate range of the first component; and determine a second reference point between the first boundary of the sub-component and the second boundary of the first component, and generate the second touch coordinate based on the second reference point.

In an exemplary embodiment, the control chip 1420 is also configured to acquire the coordinate range of the first component, and the coordinate range of the sub-component in the first component in response to the confirmation operation on the hardware peripheral;

determine a third reference point located in the coordinate range of the first component and outside the coordinate range of the sub-component; and generate a third touch coordinate based on the third reference point, and generate the first tap-to-click event based on the third touch coordinate.

In an exemplary embodiment, the control chip 1420 is also configured to control a focus component to lose a focus state, and control the first component ranked before or after the focus component in the mini program interface to be in the focus state in response to a first type of control operation on the hardware peripheral, the focus component being a component that is in the focus state before receiving the first type of control operation.

In an exemplary embodiment, the control chip 1420 is also configured to control the focus component to lose the focus state, and control the first component located at a previous hierarchy or a next hierarchy of the focus component in the mini program interface to be in the focus state in response to a second type of control operation on the hardware peripheral, the focus component being a component that is in the focus state before receiving the second type of control operation.

In an exemplary embodiment, the control chip 1420 is also configured to read a first hierarchy index corresponding to the focus component in response to the second type of control operation on the hardware peripheral;

when updating the first hierarchy index based on the operation direction of the second type of control operation to obtain a second hierarchy index, determine the first component corresponding to the second hierarchy index; and control the focus component to lose the focus state, and control the first component to switch to the focus state.

In an exemplary embodiment, the control chip 1420 is also configured to control to return to an upper interface of the mini program interface, or to close the mini program interface, or to close a pop-up window on the mini program interface in response to a third type of control operation on the hardware peripheral.

Figure 20:
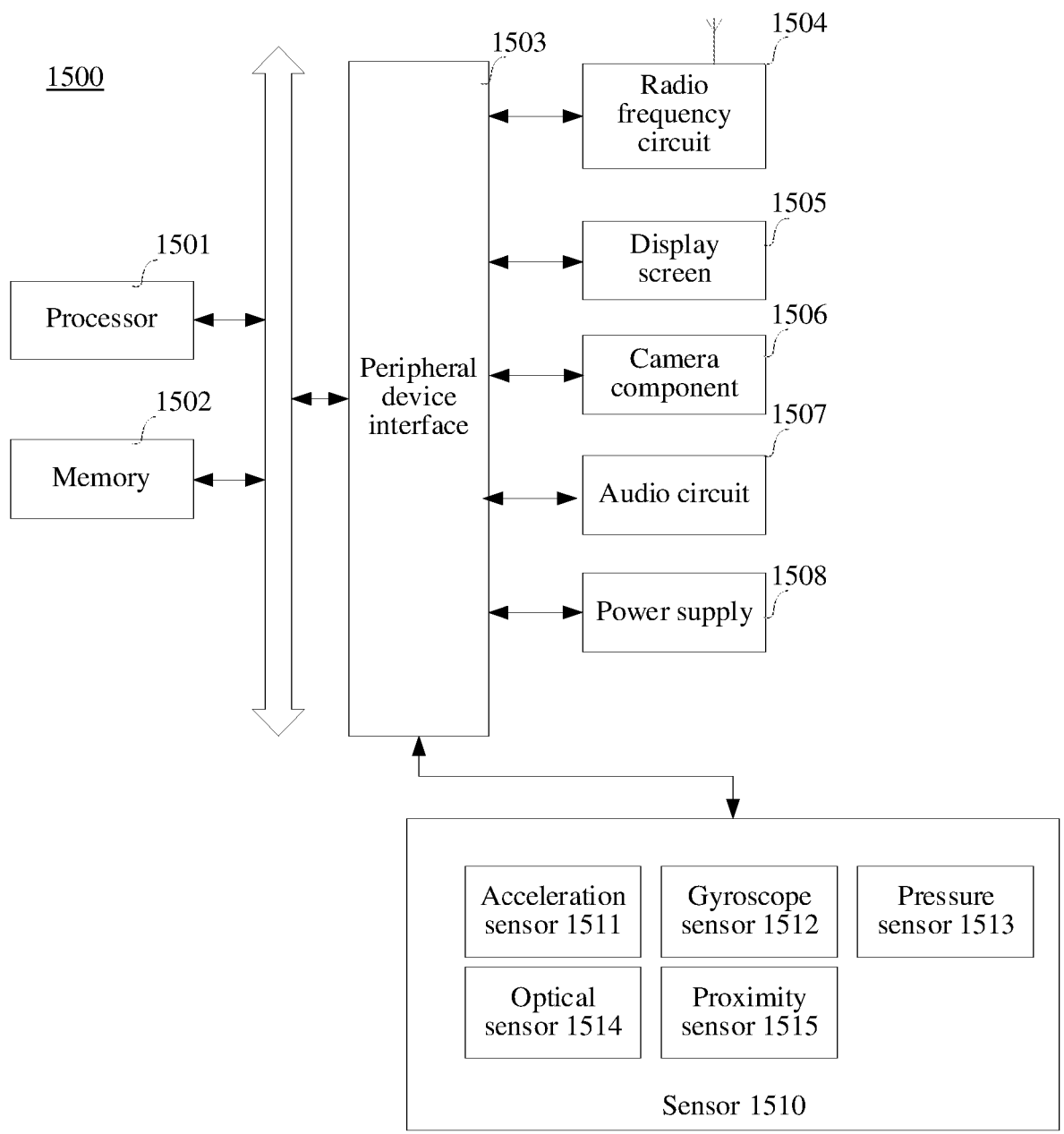
FIG. 20 is a block diagram of a vehicle terminal according to an exemplary embodiment of the present disclosure.

FIG. 20 is a structural block diagram of a vehicle terminal 1500 according to an exemplary embodiment of the present disclosure. The vehicle terminal 1500 generally includes: a processor 1501 and a memory 1502.

The processor 1501 may include one or more processing cores, for example, a 4-core processor or an 8-core processor. The processor 1501 may be implemented in at least one hardware form of digital signal processor (DSP), a field-programmable gate array (FPGA), and a programmable logic array (PLA). The processor 1501 may also include a main processor and a co-processor. The main processor is a processor configured to process data in an awake state, and is also referred to as a central processing unit (CPU). The co-processor is a low power consumption processor configured to process the data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, the non-transitory computer-readable storage medium in the memory 1502 is configured to store at least one instruction, the at least one instruction being configured to be executed by the processor 1501 to implement the vehicle terminal control method provided in the method embodiments of the present disclosure.

In some embodiments, the vehicle terminal 1500 further in one embodiment includes: a peripheral device interface 1503 and at least one peripheral device. The processor 1501, the memory 1502, and the peripheral device interface 1503 may be connected through a bus or a signal cable. Each peripheral device may be connected to the peripheral device interface 1503 through a bus, a signal cable, or a circuit board. Specifically, the peripheral device includes: at least one of a radio frequency (RF) circuit 1504, a touch display screen 1505, a camera 1506, an audio circuit 1507, and a power supply 1508.

The peripheral device interface 1503 may be configured to connect the at least one peripheral device related to input/output (I/O) to the processor 1501 and the memory 1502. In some embodiments, the processor 1501, the memory 1502, and the peripheral device interface 1503 are integrated on a same chip or circuit board. In some other embodiments, any one or two of the processor 1501, the memory 1502, and the peripheral device interface 1503 may be implemented on a single chip or circuit board, which is not limited in this embodiment. The peripheral device includes control hardware, and the control hardware includes: at least one of a hardware knob, a hardware toggle button, a hardware touch pad, and a hardware button. In an example, the control hardware includes: the hardware knob for triggering a selection operation, a confirm button for triggering a confirmation operation, and a back button for triggering a back operation. The hardware knob for triggering the selection operation may also be implemented alternatively as a hardware toggle button or a hardware touch pad. In some examples, there is a center console button supporting multiple control functions, and the center console button also supports at least one of rotation control, toggle button control, touch pad control, and button control.

The RF circuit 1504 is configured to receive and transmit a radio frequency (RF) signal, also referred to as an electromagnetic signal. The RF circuit 1504 communicates with a communication network and other communication devices through the electromagnetic signal. The RF circuit 1504 converts an electric signal into an electromagnetic signal for transmission, or converts a received electromagnetic signal into an electric signal. In one embodiment, the RF circuit 1504 includes: an antenna system, an RF transceiver, one or more amplifiers, a tuner, an oscillator, a digital signal processor, a codec chip set, a subscriber identity module card, and the like. The RF circuit 1504 may communicate with another vehicle terminal by using at least one wireless communications protocol. The wireless communication protocol includes, but is not limited to: world wide web, metropolitan area network, Intranet, various generations of mobile communication networks (2G, 3G, 4G and 5G), a wireless local area network and/or a Wireless Fidelity (WiFi) network. In some embodiments, the RF 1504 may further include a circuit related to near field communication (NFC), which is not limited in the present disclosure.

The display screen 1505 is configured to display a user interface (UI). The UI may include a graph, text, an icon, a video, and any combination thereof. In response to that the display screen 1505 is a touch display screen, the display screen 1505 further has a capability of acquiring a touch signal on or above a surface of the display screen 1505. The touch signal may be inputted to the processor 1501 as a control signal for processing. In this case, the display screen 1505 may also be configured to provide a virtual button and/or a virtual keyboard that are/is also referred to as a soft button and/or a soft keyboard. In some embodiments, one display screen 1505 may be arranged at a front panel of the vehicle terminal 1500; in some other embodiments, two display screens 1505 may be respectively arranged on different surfaces of the vehicle terminal 1500 or may be in a folding design; and in some other embodiments, the display screen 1505 may be a flexible display screen, and is arranged on a curved surface or a folded surface of the vehicle terminal 1500. Even, the display screen 1505 may be further set in a non-rectangular irregular pattern, namely, a specially-shaped screen. The display screen 1505 may be prepared from materials such as a liquid crystal display (LCD) or an organic light-emitting diode (OLED), and the like.

The camera component 1506 is configured to capture images or videos. In one embodiment, the camera component 1506 includes a front-facing camera and a rear-facing camera. Generally, the front-facing camera is disposed on the front panel of the vehicle terminal, and the rear-facing camera is disposed on a back surface of the vehicle terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1506 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1507 may include a microphone and a speaker. The microphone is configured to acquire sound waves of a user and an environment, and convert the sound waves into an electric signal to input to the processor 1501 for processing, or input to the radio frequency circuit 1504 for implementing voice communication. For the purpose of stereo acquisition or noise reduction, there may be a plurality of microphones, respectively disposed at different portions of the vehicle terminal 1500. The microphone may further be an array microphone or an omni-directional acquisition type microphone. The speaker is configured to convert electric signals from the processor 1501 or the RF circuit 1504 into sound waves. The speaker may be a conventional film speaker, or may be a piezoelectric ceramic speaker. When the speaker is the piezoelectric ceramic speaker, the speaker not only can convert an electric signal into sound waves audible to the human being, but also can convert an electric signal into the sound waves inaudible to the human being, for ranging and other purposes. In some embodiments, the audio circuit 1507 may further include an earphone jack.

The power supply 1508 is configured to supply power to all components in the vehicle terminal 1500. The power supply 1508 may be an alternating current, a direct current, a primary battery, or a rechargeable battery. When the power supply 1508 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the vehicle terminal 1500 further includes one or more sensors 1510. The one or more sensors 1510 include, but are not limited to: an acceleration sensor 1511, a gyroscope sensor 1512, a pressure sensor 1513, an optical sensor 1514, and a proximity sensor 1515.

The acceleration sensor 1511 may detect a magnitude of acceleration on three coordinate axes of a coordinate system established with the vehicle terminal 1500. For example, the acceleration sensor 1511 may be configured to detect components of gravity acceleration on the three coordinate axes. The processor 1501 may control the touch display screen 1505 to display a user interface in a landscape view or a portrait view according to a gravity acceleration signal acquired by the acceleration sensor 1511. The acceleration sensor 1511 may be further configured to acquire motion data of a game or a user.

The gyroscope sensor 1512 may detect a body direction and a rotation angle of the vehicle terminal 1500. The gyroscope sensor 1512 may cooperate with the acceleration sensor 1511 to acquire a 3D action of the user on the vehicle terminal 1500. The processor 1501 may implement the following functions according to the data acquired by the gyroscope sensor 1512: motion sensing (such as changing the UI according to a tilt operation of the user), image stabilization at shooting, game control, and inertial navigation.

The pressure sensor 1513 may be disposed at a side frame of the vehicle terminal 1500 and/or a lower layer of the touch display screen 1505. In response to that the pressure sensor 1513 is disposed at the side frame of the vehicle terminal 1500, a holding signal of the user on the vehicle terminal 1500 may be detected. The processor 1501 performs left and right hand recognition or a quick operation according to the holding signal acquired by the pressure sensor 1513. In response to that the pressure sensor 1513 is disposed on the low layer of the touch display screen 1505, the processor 1501 controls an operable component on the UI according to a pressure operation of the user on the touch display screen 1505. The operable component includes at least one of a button component, a scroll-bar component, an icon component, and a menu component.

The optical sensor 1514 is configured to acquire ambient light intensity. In an embodiment, the processor 1501 may control the display brightness of the touch display screen 1505 according to the ambient light intensity acquired by the optical sensor 1514. Specifically, in response to that the ambient light intensity is relatively high, the display brightness of the touch display screen 1505 is increased. In response to that the ambient light intensity is relatively low, the display brightness of the touch display screen 1505 is decreased. In another embodiment, the processor 1501 may further dynamically adjust a camera parameter of the camera component 1506 according to the ambient light intensity acquired by the optical sensor 1514.

The proximity sensor 1515, also referred to as a distance sensor, is generally disposed on the front panel of the vehicle terminal 1500. The proximity sensor 1515 is configured to acquire a distance between the user and the front surface of the vehicle terminal 1500. In an embodiment, in response to that the proximity sensor 1515 detects that the distance between the user and the front surface of the vehicle terminal 1500 gradually decreases, the touch display screen 1505 is controlled by the processor 1501 to switch from a screen-off state to a screen-on state. In response to that the proximity sensor 1515 detects that the distance between the user and the front surface of the vehicle terminal 1500 gradually increases, the touch display screen 1505 is controlled by the processor 1501 to switch from the screen-off state to the screen-on state.

A person skilled in the art may understand that the structure shown in FIG. 20 constitutes no limitation to the vehicle terminal 1500, and the terminal may include more or fewer components than those shown in the figure, or some components may be combined, or a different component deployment may be used.

The sequence numbers of the foregoing embodiments of the present disclosure are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium mentioned above may be a read-only memory, a magnetic disk, an optical disc, or the like.

In an exemplary embodiment, a chip is further provided. The chip includes a programmable logic circuit and/or a program instruction. The chip, when running on a computer device, is configured to implement the vehicle terminal control method in the foregoing aspects.

An exemplary embodiment also provides a computer program product or a computer program, the computer program product or the computer program including a computer instruction, the computer instruction being stored in a computer-readable storage medium. A processor of the computer device reads the computer instruction from the computer-readable storage medium, and the processor reads the computer instruction from the computer-readable storage medium, and executes the computer instruction to implement the vehicle terminal control method provided in the foregoing method embodiments.

In an exemplary embodiment, a computer-readable storage medium is further provided. The computer-readable storage medium stores a computer program, and the computer program is loaded and executed by a processor to implement the vehicle terminal control method provided in the foregoing method embodiments.

What is claimed is:

1. A control method, performed by a vehicle terminal, the vehicle terminal being provided with a touch screen and a hardware peripheral, a mini program relying on a mini program engine running in the vehicle terminal, and the method comprising:
    displaying a mini program interface of the mini program, the mini program interface comprising at least two components;
    controlling a first component of the at least two components in the mini program interface to perform a first event in response to a physical control operation on the hardware peripheral, comprising:
        generating a first touch coordinate based on a first reference point inside a coordinate range of a first component of the at least two components in response to a confirmation operation on the hardware peripheral;
        in response to the first component comprising a sub-component, determining whether the first touch coordinate belongs to a coordinate range of the sub-component, wherein the coordinate range of the sub-component is contained in the coordinate range of the first component;
        in response to the first touch coordinate not belonging to the coordinate range of the sub-component, generating a first tap-to-click event based on the first touch coordinate;
        in response to the first touch coordinate belonging to the coordinate range of the sub-component, re-generating a second touch coordinate based on the coordinate range of the sub-component and generating the first tap-to-click event based on the second touch coordinate; and
        transferring the first tap-to-click event to the mini program, a touch coordinate of the first tap-to-click event belonging to the coordinate range of the first component in a focus state, and the first tap-to-click event being configured to trigger the mini program to control the first component to perform a response event; and
    controlling a second component of the at least two components in the mini program interface to perform the first event in response to a touch operation on the touch screen.

2. The method according to claim 1, wherein generating the first tap-to-click event in response to the confirmation operation on the hardware peripheral comprises:
    generating a first touch coordinate based on a first reference point in the coordinate range of the first component in response to the confirmation operation on the hardware peripheral; and
    generating the first tap-to-click event based on the first touch coordinate in response to that the first component does not comprise a sub-component.

3. The method according to claim 1, wherein re-generating the second touch coordinate based on the coordinate range of the sub-component comprises:
    determining a first boundary of the sub-component and a second boundary of the first component based on the coordinate range of the sub-component and the coordinate range of the first component; and
    determining a second reference point between the first boundary of the sub-component and the second boundary of the first component, and generating the second touch coordinate based on the second reference point.

4. The method according to claim 1, wherein generating the first tap-to-click event in response to the physical control operation on the hardware peripheral comprises:
    acquiring the coordinate range of the first component, and the coordinate range of the sub-component in the first component in response to the confirmation operation on the hardware peripheral;
    determining a third reference point located in the coordinate range of the first component and outside the coordinate range of the sub-component; and generating a third touch coordinate based on the third reference point, and generating the first tap-to-click event based on the third touch coordinate.

5. The method according to claim 1, wherein controlling the first component of the at least two components in the mini program interface to perform the first event in response to the physical control operation on the hardware peripheral further comprises:
controlling a focus component to lose a focus state, and controlling the first component ranked before or after the focus component in the mini program interface to be in the focus state in response to a first type of control operation on the hardware peripheral, the focus component being a component that is in the focus state before receiving the first type of control operation.

6. The method according to claim 5, further comprising:
acquiring a first node in a document object model (DOM) tree corresponding to the mini program interface, the first node comprising an event node and a focus node, the event node being a node corresponding to a component with a function of responding to the physical control operation and/or the touch operation, the focus node being a node corresponding to the focus component in the focus state; and
controlling the focus component to lose the focus state, and controlling the first component ranked before or after the focus component in the mini program interface to be in the focus state in response to the first type of control operation on the hardware peripheral comprises:
reading a first focus index corresponding to the focus component in response to the first type of control operation on the hardware peripheral;
updating the first focus index based on an operation direction of the first type of control operation to obtain a second focus index;
determining the first component corresponding to the second focus index; and controlling the focus component to lose the focus state, and controlling the first component to switch to the focus state.

7. The method according to claim 6, further comprising:
controlling the first component on the mini program interface to perform a scroll display based on an operation direction of the first type of control operation in response to that the first component does not comprise a sub-component and the first component is incompletely displayed in the mini program interface.

8. The method according to claim 6, wherein acquiring the first node in the document object model (DOM) tree corresponding to the mini program interface comprises:
screening an event node among all nodes of the mini program interface;
determining the focus node among the event nodes; and
acquiring node states of the event node and the focus node; and updating the focus node according to a change of the node state.

9. The method according to claim 8, wherein screening the event node among all nodes of the mini program interface comprises:
screening the event node among all nodes of the mini program interface according to a screening condition, the screening condition comprising at least one of following:
a node registered with an event response method;
a page navigator node with a uniform resource location system (URL) not being empty;
an input node; and
a scroll-view node.

10. The method according to claim 1, wherein controlling the first component of the at least two components in the mini program interface to perform the first event in response to the physical control operation on the hardware peripheral further comprises:
controlling the focus component to lose the focus state, and controlling the first component located at a previous hierarchy or a next hierarchy of the focus component in the mini program interface to be in the focus state in response to a second type of control operation on the hardware peripheral, the focus component being a component that is in the focus state before receiving the second type of control operation.

11. The method according to claim 10, wherein controlling the focus component to lose the focus state, and controlling the first component located at the previous hierarchy or the next hierarchy of the focus component in the mini program interface to be in the focus state in response to the second type of control operation on the hardware peripheral comprises:
reading a first hierarchy index corresponding to the focus component in response to the second type of control operation on the hardware peripheral;
when updating the first hierarchy index based on an operation direction of the second type of control operation to obtain a second hierarchy index, determining the first component corresponding to the second hierarchy index; and
controlling the focus component to lose the focus state, and controlling the first component to switch to the focus state.

12. The method according to claim 11, wherein in response to that there is a subordinate relationship between the first hierarchy index and the second hierarchy index, the first component is a component corresponding to the second hierarchy index and having the subordinate relationship with the focus component; and
in response to that there is no subordinate relationship between the first hierarchy index and the second hierarchy index, the first component is the first component corresponding to the second hierarchy index.

13. The method according to claim 1, wherein controlling the first component of the at least two components in the mini program interface to perform the first event in response to the physical control operation on the hardware peripheral further comprises:
controlling to return to an upper interface of the mini program interface, or to close the mini program interface, or to close a pop-up window on the mini program interface in response to a third type of control operation on the hardware peripheral.

14. The method according to claim 13, wherein controlling to close the pop-up window on the mini program interface in response to the third type of control operation on the hardware peripheral comprises:
generating a second tap-to-click event in response to the third type of control operation on the hardware peripheral; and transferring the second tap-to-click event to the mini program, the second tap-to-click event being configured to trigger the mini program to add a data-close pop-up attribute to the node corresponding to the pop-up window, so that the pop-up window is closed.

15. A computer device for a vehicle terminal, the vehicle terminal being provided with a touch screen and a hardware peripheral, a mini program relying on a mini program engine running in the vehicle terminal, and the computer device comprising a processor and a memory, the memory storing at least one program that, when being executed, causes the processor to implement:
    displaying a mini program interface of the mini program, the mini program interface comprising at least two components;
    controlling a first component of the at least two components in the mini program interface to perform a first event in response to a physical control operation on the hardware peripheral, comprising:
        generating a first touch coordinate based on a first reference point inside a coordinate range of a first component of the at least two components in response to a confirmation operation on the hardware peripheral;
        in response to the first component comprising a sub-component, determining whether the first touch coordinate belongs to a coordinate range of the sub-component, wherein the coordinate range of the sub-component is contained in the coordinate range of the first component;
        in response to the first touch coordinate not belonging to the coordinate range of the sub-component, generating a first tap-to-click event based on the first touch coordinate;
        in response to the first touch coordinate belonging to the coordinate range of the sub-component, re-generating a second touch coordinate based on the coordinate range of the sub-component and generating the first tap-to-click event based on the second touch coordinate; and
        transferring the first tap-to-click event to the mini program, a touch coordinate of the first tap-to-click event belonging to the coordinate range of the first component in a focus state, and the first tap-to-click event being configured to trigger the mini program to control the first component to perform a response event; and
    controlling a second component of the at least two components in the mini program interface to perform the first event in response to a touch operation on the touch screen.

16. The computer device according to claim 15, wherein controlling the first component of the at least two components in the mini program interface to perform the first event in response to the physical control operation on the hardware peripheral further comprises:
    controlling a focus component to lose a focus state, and controlling the first component ranked before or after the focus component in the mini program interface to be in the focus state in response to a first type of control operation on the hardware peripheral, the focus component being a component that is in the focus state before receiving the first type of control operation.

17. A non-transitory computer-readable storage medium, storing an executable instruction that, when being executed by a processor of a vehicle terminal provided with a touch screen and a hardware peripheral, causing the processor to implement:
    displaying a mini program interface of a mini program, the mini program relying on a mini program engine running in the vehicle terminal, and the mini program interface comprising at least two components;
    controlling a first component of the at least two components in the mini program interface to perform a first event in response to a physical control operation on the hardware peripheral, comprising:
        generating a first touch coordinate based on a first reference point inside a coordinate range of a first component of the at least two components in response to a confirmation operation on the hardware peripheral;
        in response to the first component comprising a sub-component, determining whether the first touch coordinate belongs to a coordinate range of the sub-component, wherein the coordinate range of the sub-component is contained in the coordinate range of the first component;
        in response to the first touch coordinate not belonging to the coordinate range of the sub-component, generating a first tap-to-click event based on the first touch coordinate;
        in response to the first touch coordinate belonging to the coordinate range of the sub-component, re-generating a second touch coordinate based on the coordinate range of the sub-component and generating the first tap-to-click event based on the second touch coordinate; and
        transferring the first tap-to-click event to the mini program, a touch coordinate of the first tap-to-click event belonging to the coordinate range of the first component in a focus state, and the first tap-to-click event being configured to trigger the mini program to control the first component to perform a response event; and
    controlling a second component of the at least two components in the mini program interface to perform the first event in response to a touch operation on the touch screen.

18. The method according to claim 1, wherein the first touch coordinate is generated as a center point in the coordinate range of the first component.

19. The method according to claim 4, wherein determining the third reference point comprises:
    making a connection between a coordinate point closest to a coordinate origin in the coordinate range of the first component and a coordinate point closest to a coordinate origin in the coordinate range of the sub-component; and
    determining a middle point of the connection as the third reference point.

\* \* \* \* \*